United States Patent
Gupta et al.

(10) Patent No.: US 10,831,521 B2
(45) Date of Patent: Nov. 10, 2020

(54) EFFICIENT METADATA MANAGEMENT

(71) Applicant: Nutanix, Inc., San Jose, CA (US)

(72) Inventors: Karan Gupta, San Jose, CA (US); Pavan Kumar Konka, Milpitas, CA (US); Rishi Bhardwaj, San Jose, CA (US); Rohit Jain, Cupertino, CA (US); Tabrez Parvez Memon, Campbell, CA (US)

(73) Assignee: Nutanix, Inc., San Jose, CA (US)

( * ) Notice: Subject to any disclaimer, the term of this patent is extended or adjusted under 35 U.S.C. 154(b) by 146 days.

(21) Appl. No.: 15/965,656

(22) Filed: Apr. 27, 2018

(65) Prior Publication Data
US 2019/0370042 A1    Dec. 5, 2019

(51) Int. Cl.
G06F 9/455    (2018.01)
H04L 29/08    (2006.01)

(52) U.S. Cl.
CPC ........ *G06F 9/45558* (2013.01); *G06F 2009/45583* (2013.01); *H04L 67/1097* (2013.01)

(58) Field of Classification Search
CPC ....... G06F 9/45558; G06F 2009/45583; H04L 67/1097
USPC ............................................................ 718/1
See application file for complete search history.

(56) References Cited

U.S. PATENT DOCUMENTS 7,636,801 B1 * 12/2009 Kekre ............... H04L 67/1097
                                                          709/218
7,801,864 B2    9/2010 Prahlad et al.
8,095,577 B1 *  1/2012 Faibish .................. G06F 16/13
                                                          707/823
8,156,123 B2    4/2012 Tribble et al.
8,285,681 B2 * 10/2012 Prahlad ................ G06F 3/0649
                                                          707/640

(Continued)

FOREIGN PATENT DOCUMENTS

EP       3382560 A1    10/2018
JP       6398693 B2    10/2018

(Continued)

OTHER PUBLICATIONS

Bravo et al., "Saturn: a Distributed Metadata Service for Causal Consistency," ACM, Apr. 2017, 16pg. (Year: 2017).*

(Continued)

*Primary Examiner* — Ryan D. Coyer
(74) *Attorney, Agent, or Firm* — Vista IP Law Group, LLP

(57) ABSTRACT

Systems for high-performance distributed computing. The systems include techniques for managing data and metadata across multiple nodes. A method embodiment commences by storing data at a node using a first storage mechanism that is local to the node. A first set of metadata is configured to identify a storage location for the stored data. The first set of metadata is stored using the same first storage mechanism that is local to the node. For accessing the first set of metadata, a second set of metadata is configured to identify a storage location for the first set of metadata. The second set of metadata is stored using a second storage mechanism that comprises a distributed metadata storage facility that stores metadata across multiple storage locations having at least one of the multiple storage locations that is not local to the node that stores data and metadata using the first storage mechanism.

24 Claims, 20 Drawing Sheets

(56) References Cited

U.S. PATENT DOCUMENTS

| | | |
|---|---|---|
| 8,352,472 B2 | 1/2013 | Prahlad et al. |
| 8,549,518 B1 | 10/2013 | Aron et al. |
| 8,601,473 B1 | 12/2013 | Aron et al. |
| 8,615,534 B2 | 12/2013 | Cannon et al. |
| 8,850,130 B1 | 9/2014 | Aron et al. |
| 9,098,562 B2 | 8/2015 | Bettger et al. |
| 9,600,192 B2 | 3/2017 | Chambliss et al. |
| 9,772,866 B1 | 9/2017 | Aron et al. |
| 9,858,013 B1 | 1/2018 | Srivastav et al. |
| 9,880,750 B1* | 1/2018 | Ravindran ............ G06F 3/0613 |
| 1,012,697 A1 | 11/2018 | Sinha et al. |
| 2007/0179981 A1* | 8/2007 | Vincent ................ G06F 3/0605 |
| 2009/0006409 A1* | 1/2009 | Yang ...................... G06F 8/20 |
| 2009/0138444 A1 | 5/2009 | Kim et al. |
| 2009/0292947 A1* | 11/2009 | Ganesh .................. G06F 16/00 714/16 |
| 2010/0267374 A1* | 10/2010 | Armstrong .......... H04Q 3/0045 455/417 |
| 2012/0246382 A1 | 9/2012 | Wade et al. |
| 2013/0073589 A1* | 3/2013 | Smith ................ G06F 16/2471 707/770 |
| 2014/0181004 A1* | 6/2014 | Said ...................... G06F 16/254 707/602 |
| 2014/0279941 A1 | 9/2014 | Atkisson |
| 2015/0039629 A1* | 2/2015 | Theeten ................ G06F 16/325 707/747 |
| 2015/0178105 A1 | 6/2015 | Graham |
| 2015/0227521 A1* | 8/2015 | Levari .................. G06F 16/278 707/694 |
| 2015/0286495 A1 | 10/2015 | Lee |
| 2016/0062674 A1* | 3/2016 | Benight ................ G06F 16/22 711/114 |
| 2016/0070623 A1 | 3/2016 | Derk et al. |
| 2016/0124676 A1 | 5/2016 | Jain et al. |
| 2018/0284995 A1 | 10/2018 | Dantkale et al. |

FOREIGN PATENT DOCUMENTS

| | | |
|---|---|---|
| WO | WO 2011023619 A1 | 3/2011 |
| WO | WO 2016054212 A1 | 4/2016 |

OTHER PUBLICATIONS

Yu et al., "Efficient Data Management in Spatial Data Warehouses," Rutgers, 2006, 24pg. (Year: 2006).*

Apache: "What is Cassandra?", Copyright 2016, pp. all.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Ellis, Jonathan. "2012 in Review: Performance" (Jan. 14, 2013), DataStax, from https://www.datastax.com/dev/blog/2012-in-review-performance.

Lakshman, Avinash, et al. "Apache Cassandra" (Jul. 2008), from https://en.wikipedia.org/wiki/Apache_Cassandra.

Petla, S. et al. "HBA: Distributed Metadata Management for Large Cluster-Based Storage Systems" (2012), vol. 1, Issue 3, *International Journal of Engineering Innovation & Research*, from http://web.eece.maine.edu/zhu/papers/TPDS08_HBA.pdf.

Manzanares, A. "Energy Efficient Prefetching with Buffer Disks for Cluster File Systems" (2010), *2010 39th International Conference on Parallel Processing*.

Zhu, Y. et al. "HBA: Distributed Metadata Management for Large Cluster-Based Storage Systems" (Apr. 2008), vol. 19, No. 4, *IEEE Transactions on Parallel and Distributed Systems*.

Cano, I. et al., "Curator: Self-Managing Storage for Enterprise Clusters", *14th USENIX Symposium on Networked Systems Design and Implementation, NSDI '17*, (Mar. 27, 2017).

Notice of Allowance dated Aug. 25, 2020 for related U.S. Appl. No. 15/965,676.

* cited by examiner

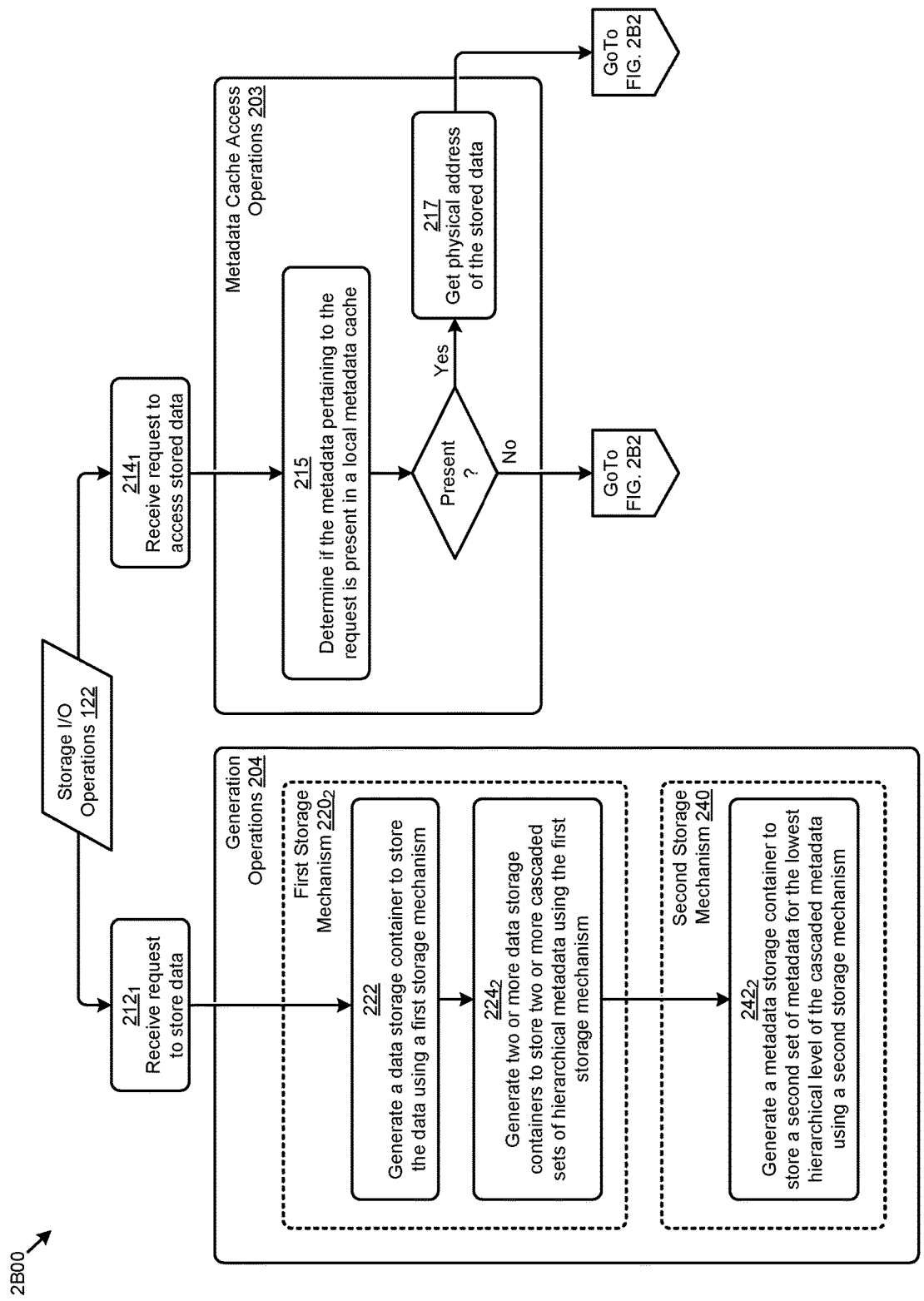
FIG. 2B1

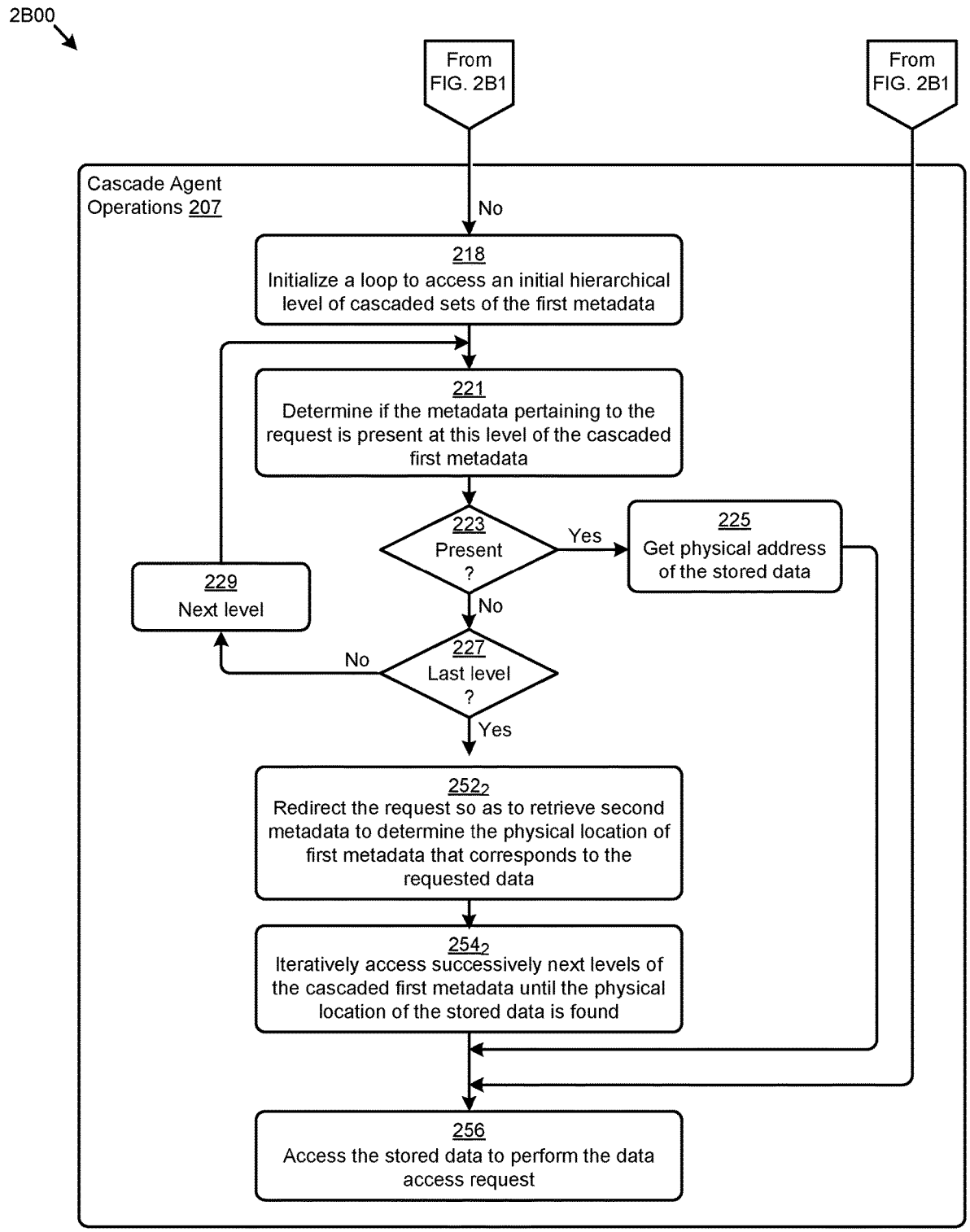
FIG. 2B2

EFFICIENT METADATA MANAGEMENT

RELATED APPLICATIONS

The present application is related to co-pending U.S. patent application Ser. No. 15/965,676 titled "LOW LATENCY ACCESS TO PHYSICAL STORAGE LOCATIONS BY IMPLEMENTING MULTIPLE LEVELS OF METADATA", filed on even date herewith, which is hereby incorporated by reference in its entirety.

FIELD

This disclosure relates to high-performance distributed computing, and more particularly to techniques for efficient management of multiple levels of metadata in distributed computing environments.

BACKGROUND

In modern computing systems, metadata is generated to facilitate access to various entities that are distributed throughout the system. As an example, a process in a computing node in a modern distributed computing system might form a directory or index or other metadata that refers to locations of stored data. This directory or index and/or other metadata presents the stored data as a logically contiguous area of data. The underlying data, however, might be non-contiguous and might be physically distributed across multiple storage facilities in a storage pool that spans multiple storage devices, multiple types of storage devices, and might serve multiple computing nodes.

In a virtualized environment, virtual disk metadata (e.g., data that describes a respective data virtual disk or "vDisk") might be generated to map logical representations of the data vDisk contents to physical storage locations of the contents. Stored data and its associated metadata are often managed using separate, different storage mechanisms that operate under separate, different storage regimes. For example, the stored data might be partitioned and distributed across a storage pool that is optimized to facilitate data access performance and data availability. In contrast, the metadata might be held in a distributed key-value store that is organized for data consistency and fault tolerance rather than for performance. As examples, the key-value store might be replicated multiple times (e.g., three times) at multiple computing nodes so as to facilitate fault tolerance in the event of failure of one or more of the computing nodes—even at the expense of performance—while at the same time the storage pool might be optimized for fast access and fast rebuild performance—even for large volumes of data.

Indeed, as the volume of stored data becomes increasingly larger and larger, more and more performance-oriented facilities (e.g., network bandwidth, drive proximity, etc.) are deployed in the data path. Unfortunately, although the associated metadata increases commensurately in volume, the key-value store regime for storing metadata does not scale for performance with respect to large or increasingly larger amounts of metadata. As an example, one petabyte of stored data might require three terabytes of metadata (~0.3%), however, key-value stores and other legacy mechanisms fail to deliver the needed performance at such large and ever larger capacities. Therefore, what is needed is a technique or techniques to improve over legacy techniques and/or over other considered approaches that address efficiently managing large volumes of fault tolerant metadata used to access large volumes of stored data in computing environments.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for efficient metadata management, which techniques advance the relevant technologies to address technological issues with legacy approaches. More specifically, the present disclosure describes techniques used in systems, methods, and in computer program products for management of multiple levels of metadata in distributed computing environments. Certain embodiments are directed to technological solutions for managing the metadata associated with stored data in accordance with the mechanism implemented for managing the stored data so as to reduce resource consumption and improve performance.

The disclosed embodiments modify and improve over legacy approaches. In particular, the herein-disclosed techniques provide technical solutions that address the technical problems attendant to efficiently managing large volumes of fault tolerant metadata used to access large volumes of stored data in computing environments. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of data storage and retrieval as well as advances in various technical fields related to massively parallel computing systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 2A, FIG. 2B1 and FIG. 2B2 depict metadata management techniques as implemented in systems that facilitate management of multiple levels of metadata in distributed computing environments, according to an embodiment.

DETAILED DESCRIPTION

Figure 1A:
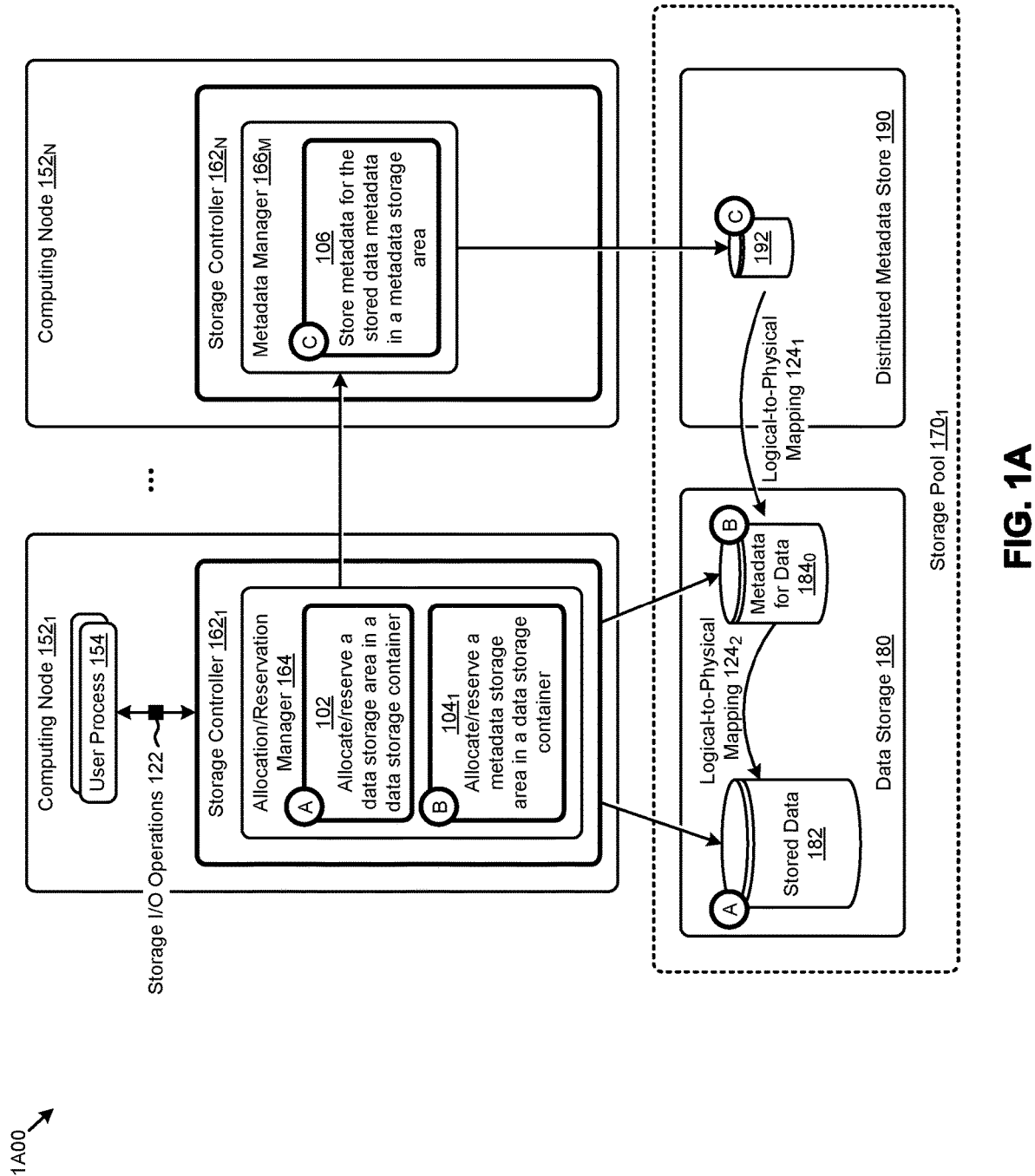
FIG. 1A and FIG. 1B illustrate distributed computing environments in which embodiments of the present disclosure can be implemented.

Embodiments in accordance with the present disclosure address the problem of efficiently managing large volumes of fault tolerant metadata used to access large volumes of stored data in computing environments. Some embodiments are directed to approaches for managing the metadata associated with stored data in accordance with the mechanism implemented for managing the stored data so as to reduce resource consumption and improve performance when accessing large volumes of stored data. The accompanying figures and discussions herein present example environments, systems, methods, and computer program products for management of multiple levels of metadata in distributed computing environments.

Overview

Disclosed herein are techniques for managing the metadata associated with stored data in accordance with the high-performance mechanism implemented for managing the stored data so as to reduce resource consumption and improve performance. Some types of metadata are efficiently stored in large volumes and accessed via a high-performance data path. At the same time, certain other types of metadata are efficiently served using a key-value store. As such, a first storage mechanism for high-performance large data storage is used to generate data storage containers (e.g., data vDisks, databases, etc.) to comprise stored data. The first storage mechanism is also used to generate metadata storage containers (e.g., metadata vDisks) to store metadata that maps a logical representation of the stored data in the data storage container (e.g., a range of logical extents) to the physical storage locations of the stored data (e.g., to actual physical blocks or pages on physical storage devices). A second, different storage mechanism is used to manage a set of distributed metadata that maps the logical representation of the metadata in the metadata storage container to the physical storage locations of the metadata.

In certain embodiments, multiple instances of metadata storage containers can be generated to form a hierarchy of metadata mapping containers. Upon receipt of a storage I/O command associated with the stored data, the hierarchy is traversed to identify the physical location of the portion of the stored data pertaining to the storage I/O command. In certain embodiments, at least some of the metadata stored in the metadata storage container corresponds to physical locations that are reserved for data, but not yet populated with data. In certain embodiments, the data storage container and the metadata storage container are stored at the same computing node.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a distributed computing environment 1A00 in which embodiments of the present disclosure can be implemented. As an option, one or more variations of distributed computing environment 1A00 or any aspect thereof may be implemented in the context of the architecture and functionality of the embodiments described herein.

The embodiment shown in FIG. 1A depicts a plurality of computing nodes (e.g., computing node $152_1$, . . . , computing node $152_N$) with access to a storage pool $170_1$ in the distributed computing environment 1A00. The computing nodes can have a respective storage controller (e.g., storage controller $162_1$, . . . , storage controller $162_N$) to facilitate operations pertaining to reading and/or writing the data in storage pool $170_1$. For example, various user processes (e.g., user process 154) might interact with the storage controllers to perform various instances of storage I/O (input/output or IO) operations 122 (e.g., write operations, read operations, etc.) over the data in storage pool $170_1$. The data accessed by user process 154 has its associated set of metadata.

For example, in the distributed computing environment 1A00, a set of metadata might be generated for a data vDisk to map logical representations of the data vDisk contents to physical storage locations of the contents in the storage pool. The stored data and its associated metadata are often managed using separate, different mechanisms that operate under separate, different storage regimes. For example, the stored data might be partitioned and distributed across the storage pool $170_1$ in a set of data storage 180 that have a caching system to facilitate data access performance and data availability. In contrast, the metadata might be held in a distributed metadata store 190 (e.g., key-value store) that is organized for data consistency and fault tolerance rather than for performance. As the volume of the underlying stored data becomes increasingly large, the associated metadata commensurately increases in volume. For example, one petabyte of data might require three terabytes of metadata (e.g., 0.3% of the data). Unfortunately, with such large volumes of metadata, the legacy mechanisms for managing the metadata are inefficient, resulting in high demands for computing, networking, and storage access resources.

The herein disclosed techniques address the problems attendant to efficiently managing large volumes of metadata by managing the metadata associated with stored data in accordance with the high-performance mechanism implemented for managing the stored data, thereby reducing resource consumption in distributed computing environments. As such, in response to certain storage I/O operations, an allocation/reservation manager 164 implements a first storage mechanism for high-performance large data storage to allocate and/or reserve a data storage area in a data storage container (e.g., a data vDisk, a database, etc.) for stored data 182 (operation 102). The first storage mechanism is also used (at operation $104_1$) to allocate and/or reserve a metadata storage area in a data storage container to store metadata for the stored data 182 (e.g., metadata for data $184_0$).

For example, metadata for data $184_0$ might describe a logical-to-physical mapping $124_2$ that maps the logical representations of stored data 182 to the physical storage locations of stored data 182. As shown, metadata manager (metadata manager $166_M$) implements a second storage mechanism. A plurality of such metadata managers can be used in systems that use the second storage mechanism to distribute metadata to nodes of a multi-node ring that distributes metadata over multiple nodes. In some embodiments, a plurality of independently operating metadata managers each run at corresponding nodes to implement the second storage mechanism to form a multi-node ring over multiple nodes. As shown here, a metadata manager serves to manage (e.g., generate, store, access, etc.) a distributed metadata store 190 that comprises a set of metadata that refers to another tier or level of metadata. This is shown in FIG. 1A. Specifically, the distributed metadata store 190 hosts metadata that itself resolves to addresses of other metadata. In the shown embodiment, the aforementioned metadata that itself resolves to addresses of other metadata is shown as the storage area 192 that comprises metadata for stored data metadata (operation 106). This arrangement supports use models that involve two different storage mechanisms. Strictly as one example, a first storage mechanism might be tuned for high-performance node-local data access to large and/or very large data stores, while a second storage mechanism is tuned for high availability of a distributed high-performance index.

In some embodiments the second storage mechanism implements a distributed database of key-value pairs, where a first sharded portion is distributed to a first node, a second sharded portion is distributed to a second node, a third sharded portion is distributed to a third node. In some cases of such a distributed database of key-value pairs, the aforementioned second node holds a copy of the first sharded portion in addition to the second sharded portion, and the aforementioned third node holds a copy of the second sharded portion in addition to the third sharded portion, and so on.

Returning to the discussion of the structure, contents and function of the distributed metadata store 190, the shown example of metadata for stored data metadata in storage area 192 describes a logical-to-physical mapping $124_1$ that maps the logical representations of metadata for data $184_0$ to the physical storage locations of metadata for data $184_0$. As shown, metadata for stored data metadata is stored in the distributed metadata store 190 (e.g., a key-value store that is organized for data consistency and fault tolerance rather than for performance), but the size of the storage area 192 to hold the metadata for stored data metadata is reduced (e.g., 0.3% of metadata for data $184_0$). In certain embodiments, additional hierarchical levels of metadata can be stored in data storage 180 that are formed in accordance with the first mechanism to further reduce the volume of metadata stored in distributed metadata store 190. This is shown in FIG. 1B.

Figure 1B:
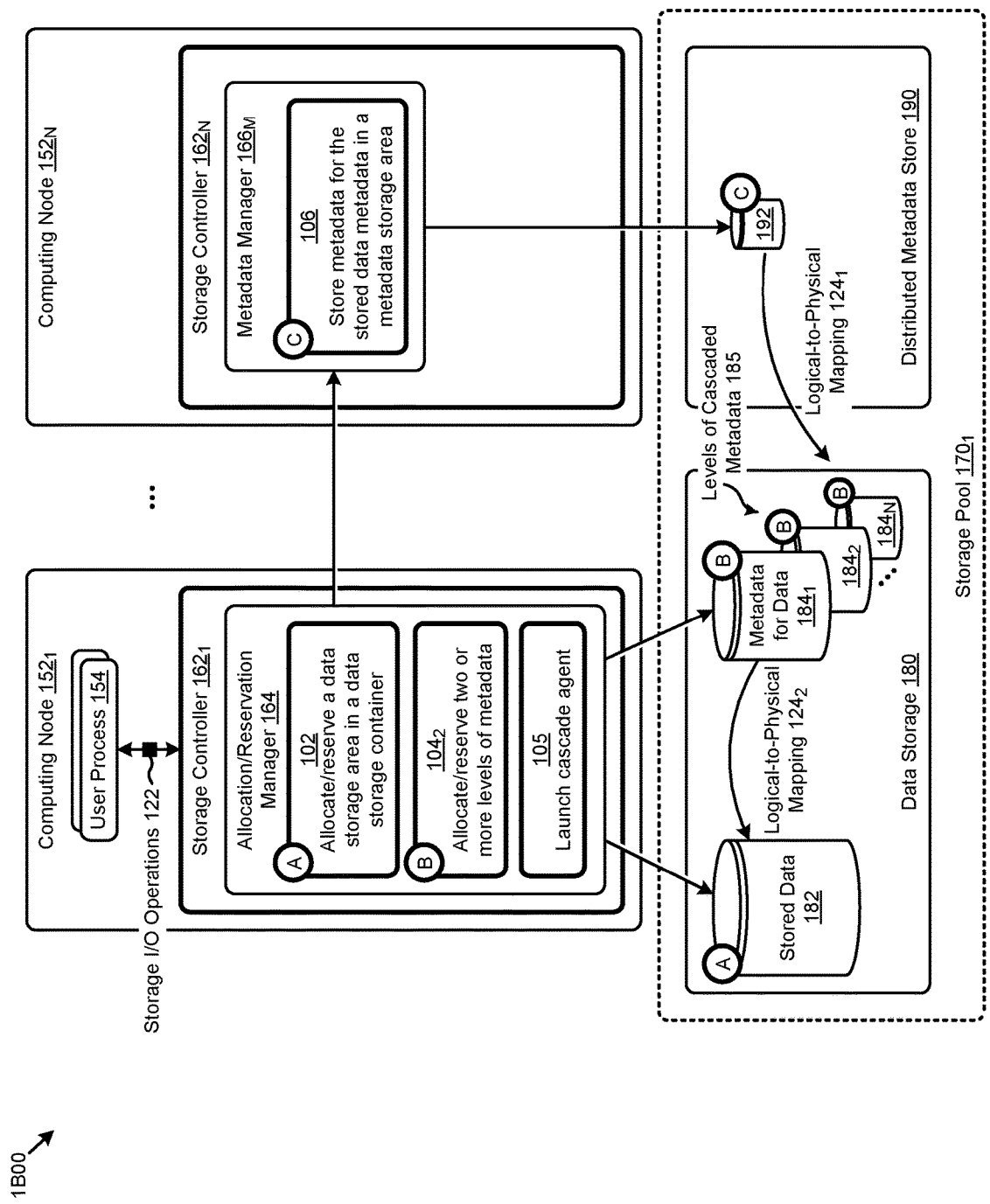

Specifically, FIG. 1B depicts a system 1B00 that comprises N levels of metadata. The implementation of N levels of metadata has several desirable effects: (1) even though the size of the storage pool can grow boundlessly, the storage area 192 should be limited to a size that can be hosted by a single node. Strictly as one example, adding two additional hierarchical levels as shown in FIG. 1B would need only a small storage area 192 to support a storage pool of many petabytes. For instance, using a 1% ratio for metadata to data, 10 petabytes of stored data would need 100 terabytes of metadata at a highest hierarchical level, 1 terabyte at a next lower hierarchical level, and 10 gigabytes at further next lower level; thus, at most, only 100 megabytes of storage space would need to be stored in storage area 192 of a given node.

Continuing this example with respect to the depiction of FIG. 1B, if stored data 182 contains 10 petabytes, then metadata for data $184_1$ would hold 100 terabytes of metadata at a highest hierarchical level, the next lower level metadata $184_2$ would hold 1 terabyte, and a lowest level metadata $184_N$ would hold 10 gigabytes; thus only 100 megabytes of storage space would need to be stored in storage area 192. In example petabyte deployments, the entire 100 megabytes of metadata in the storage area 192 can fit into the main memory (e.g., RAM) of a single compute node.

In a system that supports multiple levels of cascaded metadata 185, each successively lower level of the cascaded metadata storage comprises a logical representation of the metadata to which it refers. For example, metadata in a successively lower metadata storage container comprises a set of physical storage locations of one-level higher metadata storage to which it refers. In the example shown, the cascaded metadata comprises a first subset (e.g., metadata for data $184_1$) that identifies the storage location for the data, a second subset (e.g., next lower level metadata $184_2$) that identifies a storage location of the first subset, and a third set of metadata that identifies a storage location of the second subset, and so on to a lowest level (e.g., lowest level metadata $184_N$).

For establishing the foregoing cascaded metadata, and for establishing a processing agent that can traverse through multiple levels of metadata (e.g., multiple levels of metadata of different types), the allocation/reservation manager 164 allocates data storage in a data storage container (step 102) after which, as shown, step $104_2$ serves to allocate or reserve two or more levels of metadata in a cascade. In such situations where there are more levels of metadata in a cascade, a specially configured cascade agent is launched (at step 105). The cascade agent can thenceforth participate in processing storage I/O operations. In some cases, the cascade agent is launched regardless of the number of levels in the cascade. It is sometimes possible that the number of levels in the cascade is just one. As such, the specially configured cascade agent can process a cascade having only one level.

The aforementioned metadata management techniques of FIG. 1A and FIG. 1B are shown and described as pertains to FIG. 2A, FIG. 2B1, and FIG. 2B2.

Figure 2A:
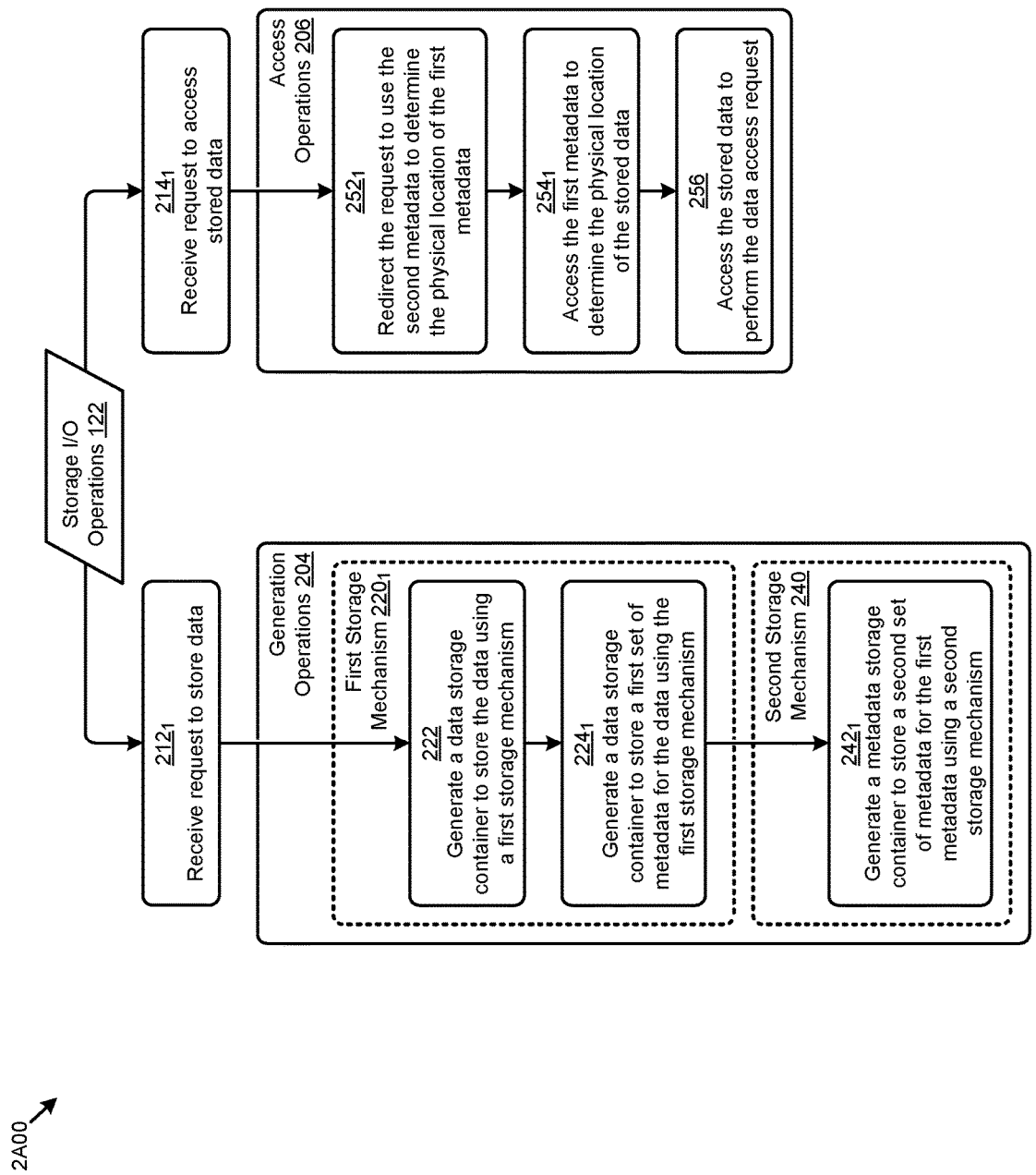

FIG. 2A depicts a metadata management technique 2A00 as implemented in systems that facilitate management of multiple levels of metadata in distributed computing environments. As an option, one or more variations of metadata management technique 2A00 or any aspect thereof may be implemented in the context of the architecture and functionality of the embodiments described herein. The metadata management technique 2A00 or any aspect thereof may be implemented in any environment.

The metadata management technique 2A00 presents one embodiment of certain steps and/or operations that facilitate management of multiple levels of metadata in distributed computing environments. As shown, the steps and/or operations can be grouped in a set of generation operations 204 according to a first storage mechanism $220_1$, a second storage mechanism 240, and a set of access operations 206. As used herein, a "storage mechanism" comprises a distinct set of data storage and/or access techniques that facilitate a particular set of objectives. For example, one storage mechanism might implement virtual disks having distributed data accessible through a low latency caching system to facilitate data access performance and data availability. Another storage mechanism might store key-value pairs replicated over a multi-node ring structure across various computing nodes to facilitate data consistency and fault tolerance (e.g., rather than performance).

As illustrated, generation operations 204 are invoked by receiving a request to store data (step $212_1$) from storage I/O operations 122. A data storage container is generated according to the first storage mechanism $220_1$ to store the data (step 222). Another data storage container is generated according to the first storage mechanism $220_1$ to store a first set of metadata associated with the data (step $224_1$). As an example, the foregoing data storage containers might be vDisks. The second storage mechanism 240 is used to generate a metadata storage container to store a second set of metadata associated with the first set of metadata (step $242_1$). For example, the metadata storage container might be a physical key-value store.

Access operations 206 are invoked by receiving a request to access stored data (step $214_1$) from storage I/O operations 122. The request is redirected to a process or agent process to use the second metadata to determine the physical location of the first metadata (step $252_1$). Next the first metadata is accessed (e.g., at its physical storage locations) to determine the physical location of the stored data (step $254_1$). Then the stored data is accessed (e.g., at its physical storage locations) to perform the data access request (step 256).

FIG. 2B1 and FIG. 2B2 depicts an N-level metadata management technique 2B00 as implemented in systems that facilitate management of multiple levels of metadata in distributed computing environments. As an option, one or more variations of N-level metadata management technique 2B00 or any aspect thereof may be implemented in the context of the architecture and functionality of the embodiments described herein. The N-level metadata management technique 2B00 or any aspect thereof may be implemented in any environment.

The N-level metadata management technique 2B00 shares certain of the steps of metadata management technique 2A00, however technique includes several features that differ from and/or augment metadata management technique 2A00. Specifically, the embodiment of first storage mechanism $220_2$ includes a step $224_2$ that serves to generate cascaded metadata from data storage containers. The structural results of generating cascaded metadata are depicted in FIG. 1B, specifically the shown cascaded metadata 185. The specific depiction of cascaded metadata 185 of FIG. 1B shows three levels, however any number of levels are possible. The number of levels can be determined based on a data-to-metadata ratio (e.g., 3%, 1%, etc.), a size of a "large" data container, and a desired limit in size of the storage area 192.

Continuing with the discussion of FIG. 2B1 and FIG. 2B2, once the storage containers for the cascaded metadata has been allocated, processing proceeds to step $242_2$, where, in accordance with the second storage mechanism 240, a metadata container is allocated and possibly populated to store a second set of metadata that refers to the lowest level of the cascaded metadata 185. As such, when processing a data access request that refers to a particular data item, it is possible to traverse from the second set of metadata, then upward through any number of levels of cascaded metadata (e.g., from the lowest level to the highest level) and then to access the stored data corresponding to the request. It is also possible to traverse from higher levels of the cascade downward through lower levels of the cascade. Moreover, it is possible that certain data or metadata exists in a caching layer of a particular node.

More specifically, and as shown on the right side of FIG. 2B1 and in FIG. 2B2, when a request to access stored data is received (e.g., step $214_1$), metadata cache access operations 203 are performed (e.g., step 215) to check (at step 216) if the requested item of metadata (e.g., a logical-to-physical mapping) exists in a metadata caching layer of a particular node (e.g., in a local cache memory). If so, step 217 serves to access the entry in the metadata cache so as to get the physical address of the stored data, and the stored data can then be accessed using the physical address. This is depicted by the "Yes" branch of the decision that results in performance of step 217.

On the other hand, if the requested item of metadata is not present in the metadata cache, then additional steps are taken to service the request. Some of such additional steps taken to service the request are depicted in FIG. 2B2.

FIG. 2B2 depicts a portion of N-level metadata management technique 2B00 as implemented by a cascade agent. The shown cascade agent operations 207 commences at step 218. The specifics as to the characteristics of the cascade, including its size (e.g., number of levels) and the physical addresses of any or all of the base addresses of any of the storage containers, can be stored in any location in the cluster, and can be retrieved using any know method. As such, step 218 serves to initialize a loop to refer to an initial hierarchical level.

At step 221 a determination is made as to whether or not the particular sought-after metadata is present at an initial level of the cascaded metadata. At decision 223, if the sought-after metadata is present at an initial level of the cascaded metadata, then at step 225 the needed physical address can be taken from the presently-found metadata and processing proceeds to step 256. On the other hand, if the sought-after metadata is not present, then processing might loop back to a next lower level of the cascaded metadata. Accordingly, decision 227 serves to determine if there is a next lower level and, if so, direct processing loop again (e.g., at step 229). After establishing the next lower level (if present), processing returns to step 221 which again executes so as to make a determination as to whether or not the particular sought-after metadata is present at this level of the cascaded metadata. The steps and decisions of the loop can be iterated over a number of times that corresponds to the number of levels of the cascaded metadata. If the sought-after metadata is not located in the iterated-over cascaded metadata, then the "Yes" branch of decision 227 is taken.

It can happen that a particular sought-after data item might not exist in the cascaded metadata as was processed in the loop. In such cases, at step $252_2$, the request to access data is redirected to an operational unit that is able to process the second metadata so as to determine the physical location of a cascade of metadata that corresponds to the sought-after data item. When the physical address of the particular cascade that corresponds to the sought-after data item is located (e.g., by retrieving the physical location from the second metadata), then that cascade is processed by iteratively traversing through successively next levels of the particular cascade until the physical location of the stored data is found (step $254_2$), after which, at step 256, the data operation corresponding to the data access request is initiated.

The aforementioned cascade agent and/or any portions of the cascade agent operations 207 can be performed in any computing environment. In one embodiment, the cascade agent can operate on any one or more nodes in a distributed computing environment (e.g., cluster).

One specific example of a distributed computing environment includes virtualized controllers that support creation and use of virtualized entities, such as vDisks. Such a distributed virtualization environment can be configured to carry out any of the herein disclosed techniques. An example distributed virtualization environment is presented and discussed as pertains to FIG. 3.

Figure 3:
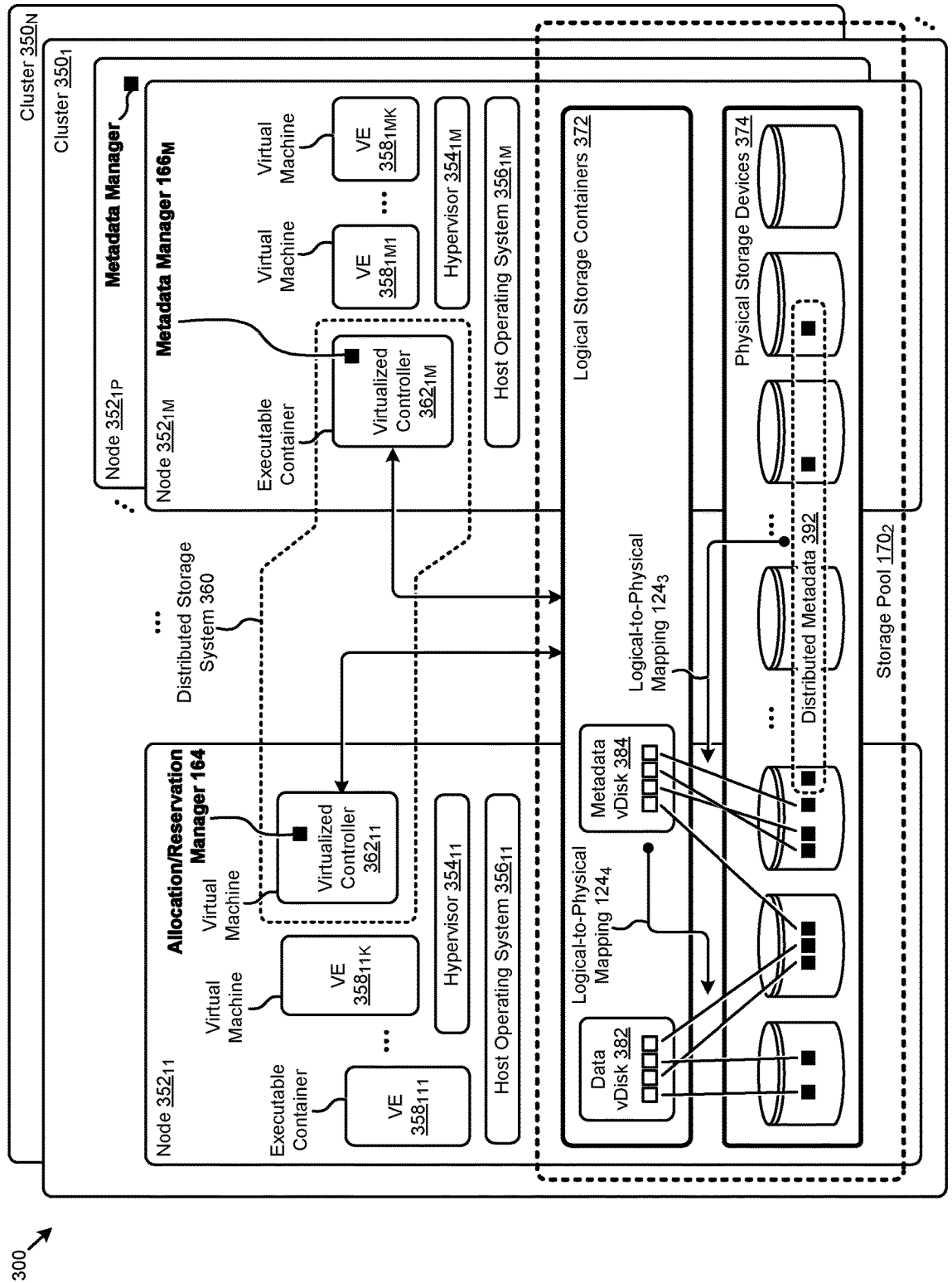
FIG. 3 presents a distributed virtualization environment in which embodiments of the present disclosure can be implemented.

FIG. 3 presents a distributed virtualization environment. As an option, one or more variations of distributed virtualization environment 300 or any aspect thereof may be implemented in the context of the architecture and functionality of the embodiments described herein.

The shown distributed virtualization environment depicts various components associated with one instance of a distributed virtualization system (e.g., hyperconverged distributed system) comprising a distributed storage system 360 that can be used to implement the herein disclosed techniques. Specifically, the distributed virtualization environment 300 comprises multiple clusters (e.g., cluster $350_1, \ldots,$ cluster $350_N$) comprising multiple nodes that have multiple tiers of storage in a storage pool $170_2$. Representative nodes (e.g., node $352_{11}, \ldots,$ node $352_{1M}$, node $352_{1P}$) and storage pool $17_{02}$ associated with cluster $350_1$ are shown. Each node can be associated with one server, multiple servers, or portions of a server. The nodes can be associated (e.g., logically and/or physically) with the clusters. As shown, the multiple tiers of storage in storage pool $170_2$ include storage that is accessible through a network (e.g., a storage area network or SAN, network attached storage or NAS, etc.). The multiple tiers of storage further include instances of node-local storage that, for example, can be within or directly attached to a server and/or appliance associated with the nodes. Such local storage can include solid state drives, hard disk drives, and/or other storage devices. Physical storage devices 374 can be accessed directly or through one or more logical storage containers 372 (e.g., vDisks, etc.).

As shown, the nodes in distributed virtualization environment 300 can implement one or more user virtualized entities (e.g., VE $358_{111}, \ldots,$ VE $358_{11K}$; VE $358_{1M1}, \ldots,$ VE $358_{1MK}$), such as virtual machines (VMs) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., a node host computer) running a single host operating system (e.g., host operating system $356_{11}, \ldots,$ host operating system $356_{1M}$), while the VMs run multiple applications on various respective guest operating systems. Such flexibility can be facilitated at least in part by a hypervisor (e.g., hypervisor $354_{11}, \ldots,$ hypervisor $354_{1M}$), which hypervisor is logically located between the various guest operating systems of the VMs and the host operating system of the physical infrastructure (e.g., node).

As an alternative to hypervisors, executable containers are implemented at the nodes in an operating system-based virtualization environment or container virtualization environment. The executable containers comprise groups of processes and/or resources (e.g., memory, CPU, disk, etc.) that are isolated from the node host computer and other executable containers. Such executable containers directly interface with the kernel of the host operating system (e.g., host operating system $356_{11}, \ldots,$ host operating system $356_{1M}$) without, in most cases, a hypervisor layer. This lightweight implementation can facilitate efficient distribution of certain software components, such as applications or services (e.g., micro-services). As shown, distributed virtualization environment 300 can implement both a hypervisor-assisted virtualization environment and a container virtualization environment for various purposes.

Distributed virtualization environment 300 also comprises at least one instance of a virtualized controller to facilitate access to storage pool $170_2$ by the VMs and/or the executable containers. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor).

Multiple instances of such virtualized controllers can coordinate within a cluster to form distributed storage system 360 which can, among other operations, manage storage pool $170_2$. This architecture further facilitates efficient scaling of the distributed virtualization system. The foregoing virtualized controllers can be implemented in distributed virtualization environment 300 using various techniques. Specifically, an instance of a virtual machine at a given node can be used as a virtualized controller in a hypervisor-assisted virtualization environment to manage storage and I/O activities. In this case, for example, the virtualized entities at node $352_{11}$ can interface with a controller virtual machine (e.g., virtualized controller $362_{11}$) through hypervisor $354_{11}$ to access storage pool $170_2$. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with distributed storage system 360.

For example, a hypervisor at one node in distributed storage system 360 might correspond to a first software vendor, and a hypervisor at another node in distributed storage system 360 might correspond to a second software vendor. As another virtualized controller implementation example, executable containers (e.g., Docker containers) can be used to implement a virtualized controller (e.g., virtualized controller $362_{1M}$) in an operating system virtualization environment at a given node. In this case, for example, the virtualized entities at node $352_{1M}$ can access storage pool $170_2$ by interfacing with a controller container (e.g., virtualized controller $362_{1M}$) through hypervisor $354_{1M}$ and/or the kernel of host operating system $356_{1M}$.

In certain embodiments, one or more instances of an allocation/reservation manager and/or metadata manager can be implemented in distributed storage system 360 to facilitate the herein disclosed techniques. As an example, allocation/reservation manager 164 can be implemented in virtualized controller $362_{11}$, and metadata manager $166_M$ can be implemented in virtualized controller $362_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., allocation/reservation manager 164 and metadata manager $166_M$). Further, in certain embodiments, a data vDisk 382 and a metadata vDisk 384 might be generated by allocation/reservation manager 164 according to the herein disclosed techniques. As shown, metadata vDisk 384 might comprise data that describes a logical-to-physical mapping $124_4$ that maps the logical representations of the stored data at data vDisk 382 to the physical storage locations (e.g., in physical storage devices 374) of the stored data. Metadata manager $166_M$ might further generate and store a set of distributed metadata 392 that describe a logical-to-physical mapping $124_3$ that maps the logical representations of the stored metadata at metadata vDisk 384 to the physical storage locations (e.g., in physical storage devices 374) of the stored metadata.

Figure 4:
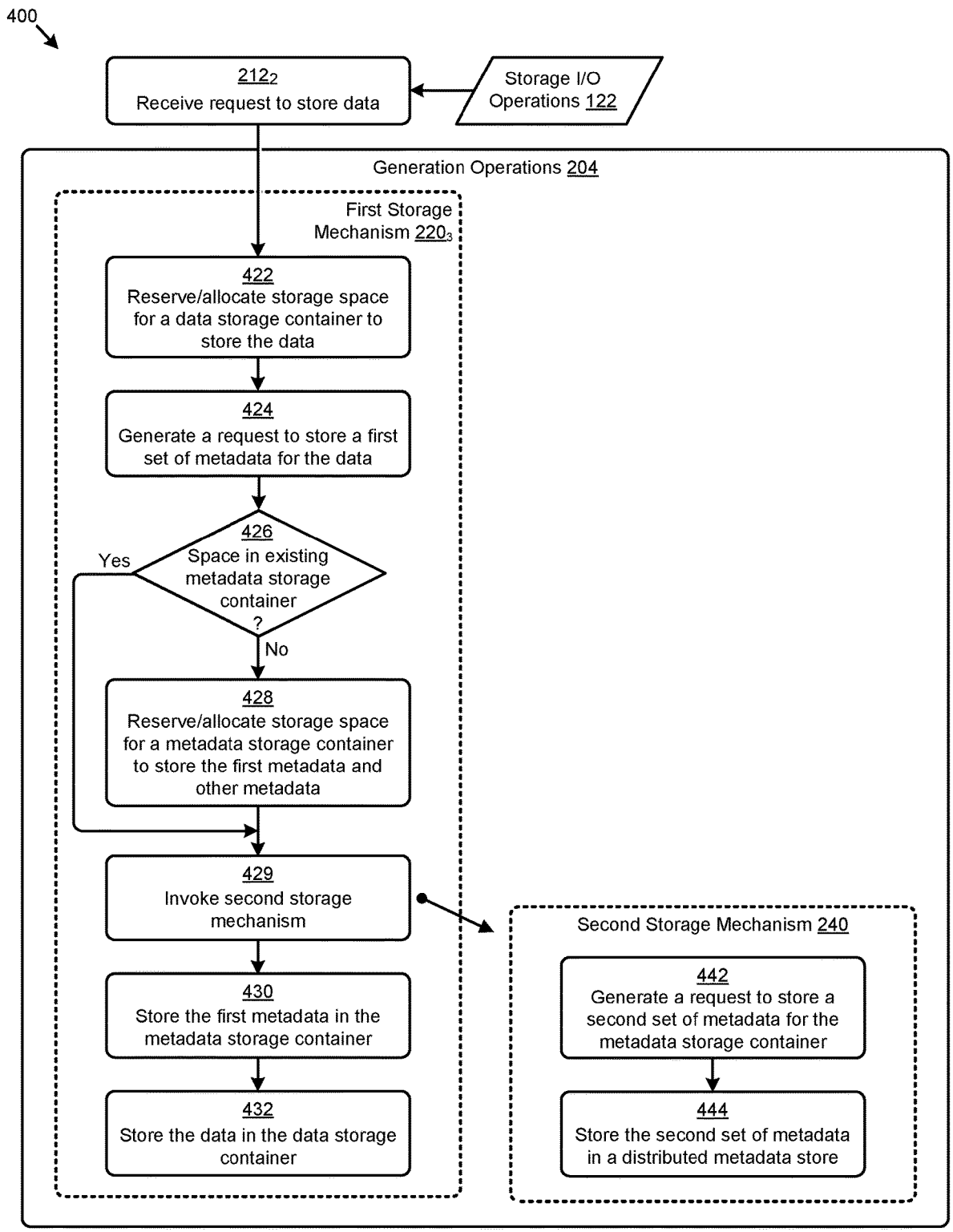
FIG. 4 depicts a metadata container generation technique as implemented in systems that facilitate management of multiple levels of metadata in distributed computing environments, according to an embodiment.

As can be observed, the respective storage mechanisms implemented by allocation/reservation manager 164 and metadata manager $166_M$ to generate metadata storage containers are separate and distinct, as disclosed in further detail in FIG. 4.

FIG. 4 depicts a metadata container generation technique 400 as implemented in systems that facilitate management of multiple levels of metadata in distributed computing environments. As an option, one or more variations of metadata container generation technique 400 or any aspect thereof may be implemented in the context of the architecture and functionality of the embodiments described herein. The metadata container generation technique 400 or any aspect thereof may be implemented in any environment.

The metadata container generation technique 400 presents one embodiment of certain steps and/or operations that facilitate generation of metadata storage containers for management of multiple levels of metadata in distributed computing environments. As shown, a portion of the steps and/or operations of the metadata container generation technique 400 comprise an embodiment of generation operations 204 earlier described. A first portion of generation operations 204 can be performed in accordance with a first storage mechanism 2203 and a second portion of the generation operations 204 can be performed in accordance with a second storage mechanism 240. As illustrated, the steps and/or operations of the embodiment of generation operations 204 presented in FIG. 4 are invoked by receiving a request to store data (step $212_2$) from the storage I/O operations 122. Storage space for a data vDisk to store the data is reserved/allocated according to the first storage mechanism (step 422). A request to store a first set of metadata for the data is generated (step 424). If there is no space for the first set of metadata in an existing metadata vDisk (see "No" path of decision 426), storage space for a metadata vDisk to store the first set of metadata is reserved/allocated according to first storage mechanism (step 428).

If there is space for the first set of metadata in an existing metadata vDisk (see "Yes" path of decision 426), or a new metadata vDisk has been generated (step 428), step 429 serves to invoke processes that implement the second storage mechanism 240. As shown, two sets of processing operations are performed contemporaneously. Specifically, (1) the first set of metadata is stored in the metadata vDisk (step 430) after which the data is also stored in the data vDisk (step 432), and (2) a metadata vDisk is generated in accordance with the second storage mechanism (step 442) after which the second set of metadata is stored in a distributed metadata store (step 444).

The first set of metadata can codify the mapping between the logical representation of the data in the data vDisk and the physical storage locations of the data. In some cases, the size (e.g., 1 GB) of the metadata vDisk can be configured so as to comprise other metadata that is associated with an unpopulated portion of the data vDisk or associated with other vDisks. As such, the metadata vDisk can be created upon a first write to a particular data vDisk, and many more data writes (e.g., thousands) to one or more data vDisks can be processed without modifying the metadata in the metadata vDisk.

The foregoing descriptions of processing operations that are performed contemporaneously is merely one possible implementation. Some of the foregoing operations can be performed serially. Strictly as one example, when the metadata vDisk has been allocated, a request to store a second set of metadata for the metadata vDisk is generated in accordance with a second storage mechanism 240 (step 442), after which metadata vDisk generation has completed. The second set of metadata is then stored in a distributed metadata store (e.g., key-value store) according to the second storage mechanism 240.

A scenario illustrating an implementation of the metadata container generation technique 400 is disclosed in FIG. 5A through FIG. 5D.

FIG. 5A, FIG. 5B, FIG. 5C, and FIG. 5D illustrate a metadata container generation scenario 500 as implemented in systems that facilitate management of multiple levels of metadata in distributed computing environments. As an option, one or more variations of metadata container generation scenario 500 or any aspect thereof may be implemented in the context of the architecture and functionality of the embodiments described herein. The metadata container generation scenario 500 or any aspect thereof may be implemented in any environment.

Figure 5A:
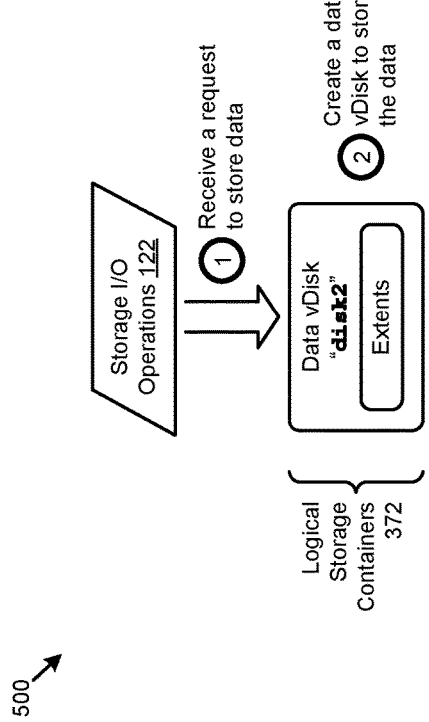
FIG. 5A, FIG. 5B, FIG. 5C, and FIG. 5D illustrate a metadata container generation scenario as implemented in systems that facilitate management of multiple levels of metadata in distributed computing environments, according to an embodiment.

The metadata container generation scenario 500 in FIG. 5A, FIG. 5B, FIG. 5C, and FIG. 5D presents a time sequence of operations pertaining to the generation of metadata storage containers for management of multiple levels of metadata in distributed computing environments. Specifically, FIG. 5A depicts a set of storage I/O operations 122 from which a request to store a set of data is received (operation 1). In response to the receiving the request, a data vDisk "disk2" is created to store the data (operation 2). The data vDisk "disk2" is one of a set of logical storage containers 372. As such, the data vDisk "disk2" comprises a set of extents, which are sets (e.g., 1 MB) of logically contiguous blocks that represent the stored data.

Figure 5B:
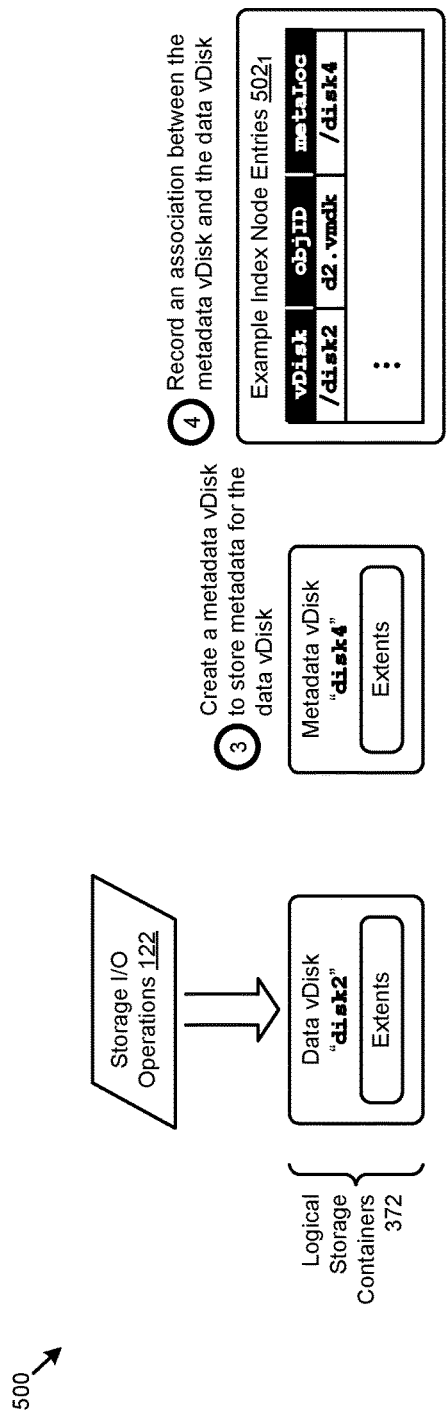

Referring to FIG. 5B, a metadata vDisk "disk4" is created to store a set of metadata for the data vDisk "disk2" (operation 3). The metadata vDisk "disk4" is similar to the data vDisk "disk2" in that it also comprises extents to logically represent the stored metadata in one of the logical storage containers 372. An association between the metadata vDisk "disk4" and the data vDisk "disk2" is recorded (operation 4). For example, the association between the vDisks might be recorded in the file system of the distributed computing environment as indicated in the example index node entries $502_1$.

Figure 5C:
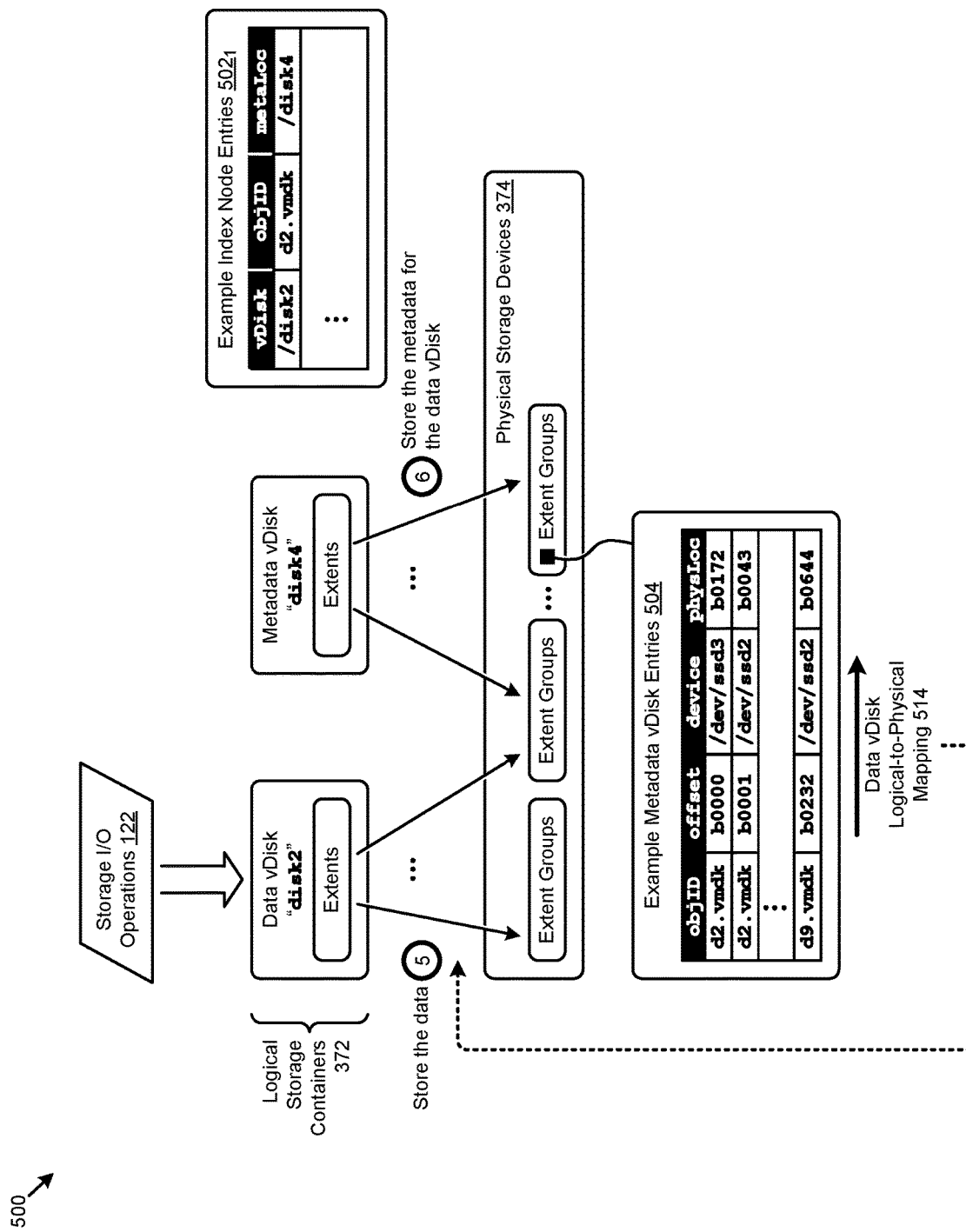

Referring to FIG. 5C, the metadata container generation scenario 500 continues with storing the data (operation 5) and storing the metadata for the data vDisk "disk2" (operation 6). As can be observed, the data and the metadata for their respective vDisks are physically stored in extent groups distributed across a set of physical storage devices 374. Extent groups are sets (e.g., 1 MB, 4 MB, etc.) of physically contiguous stored data. As shown in the example metadata vDisk entries 504, at least a portion of the metadata contained in the metadata vDisk "disk4" codifies a data vDisk logical-to-physical mapping 514. Specifically, the metadata in the metadata vDisk maps the logical representations in the extents of data vDisk "disk2" to corresponding physical extent group storage locations in physical storage devices 374. As an example, the example metadata vDisk entries 504 map the logical block "b0001" of "disk2" (e.g., represented by the object identifier "d2.vmdk") to physical block "b0043" at device "/dev/ssd2".

Figure 5D:
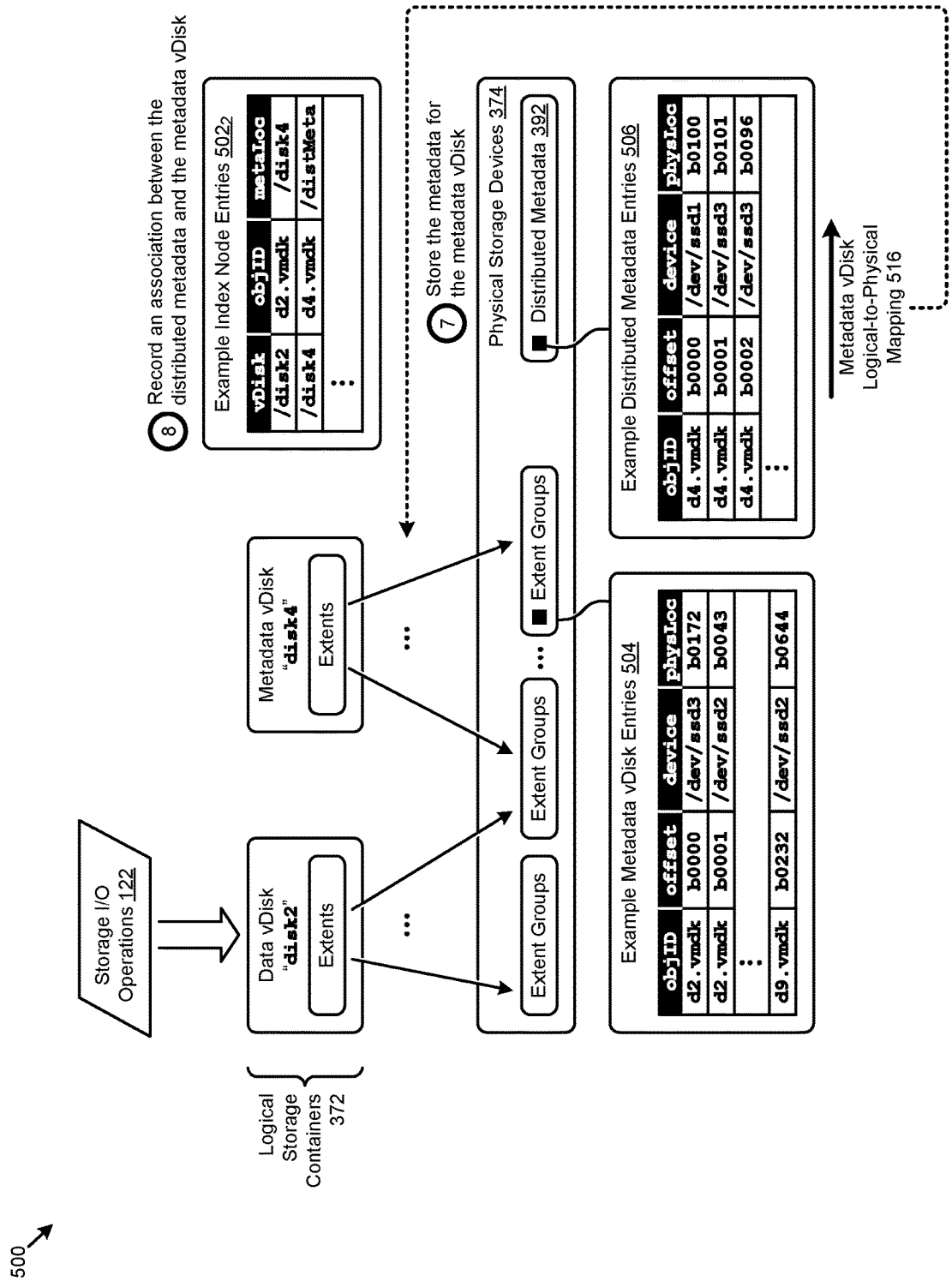

Referring to FIG. 5D, a set of distributed metadata 392 for the metadata vDisk "disk4" is stored in physical storage devices 374 (operation 7). As illustrated, distributed metadata 392 is stored under a separate, different storage mechanism and/or regime. At least a portion of distributed metadata 392 codifies a metadata vDisk logical-to-physical mapping 516. Specifically, distributed metadata 392 maps the logical representations in the extents of metadata vDisk "disk4" to corresponding physical extent group storage locations in physical storage devices 374. As an example, the example distributed metadata entries 506 map the logical block "b0002" of "disk4" (e.g., represented by the object identifier "d4.vmdk") to physical block "b096" at device "/dev/ssd3". An association between the distributed metadata and the metadata vDisk "disk4" is recorded (operation 8), as depicted in the instance of the example index node entries $502_2$ by the row comprising the "/disk4" identifier for metadata vDisk "disk4" and the "/distMeta" identifier for the access point of distributed metadata 392.

The foregoing data storage containers and/or and forms of metadata and/or any of the foregoing data structures can be generated and/or populated in an order that varies from the specific depictions as shown in FIG. 5A through 5D. Strictly as one example of such a variation, it can sometimes happen that the request to store data (operation 1) pertains to a relatively small amount of data. In such a case, in some embodiments, the data vDisk to store the relatively small amount of data is created (operation 2), and rather than immediately creating a metadata vDisk for the just-created data vDisk (operation 3), instead, distributed metadata 392 is stored (operation 7) so as to provide a logical-to-physical mapping directly to the just-created data vDisk.

It can also happen that at a first time, even though a relatively small amount of data is initially populated into the data vDisk, the data volume increases over time. For example, suppose the initially-created vDisk has merely some header or identifying information, but then the initially-created vDisk become the target repository for a very large amount of data. In such a case, as data is loaded into the data vDisk, there comes a point where it is more efficient to hold metadata for the data vDisk in a metadata vDisk that is collocated (e.g., at the same node) with the data vDisk. When that point is reached, then a collocated metadata vDisk to store metadata for the data vDisk is created (operation 3) and the association between the data vDisk and its metadata vDisk is recorded (operation 4). New entries into the distributed metadata 392 that include the metadata vDisk logical-to-physical mapping 516 can then be generated and stored at one or more nodes that host the distributed metadata (operation 7). Moreover, as the subject data vDisk grows still larger, there might come a point in time where it is expedient to hold metadata for the data vDisk in multiple levels of cascaded metadata (e.g., in a cascade of metadata vDisks) that are collocated with the data vDisk.

As such, with respect to the foregoing cases, it is possible that a data vDisk initially has only distributed metadata and does not have a corresponding collocated metadata vDisk. In still other cases, the initially-created data vDisk is created as a storage container having a very large initial allocation of storage space, yet, the storage container is initially populated with only a relatively small amount of data. In such cases, the distributed metadata can hold metadata that is associated with the allocated but unpopulated portion of the data vDisk. In some such cases, metadata can refer to ranges of space in the data container (e.g., ranges of logical extents) which, although initially unpopulated, can later be used as physical storage locations to hold large amounts of stored data. This technique of initial allocation for later population avoids fragmentation of storage areas on storage devices.

The foregoing data storage containers and/or data structures that are generated and/or populated according to the herein disclosed techniques facilitate efficient and high availability data access. One possible data access technique for efficient and high availability data access is shown and described as pertains to FIG. 6.

Figure 6:
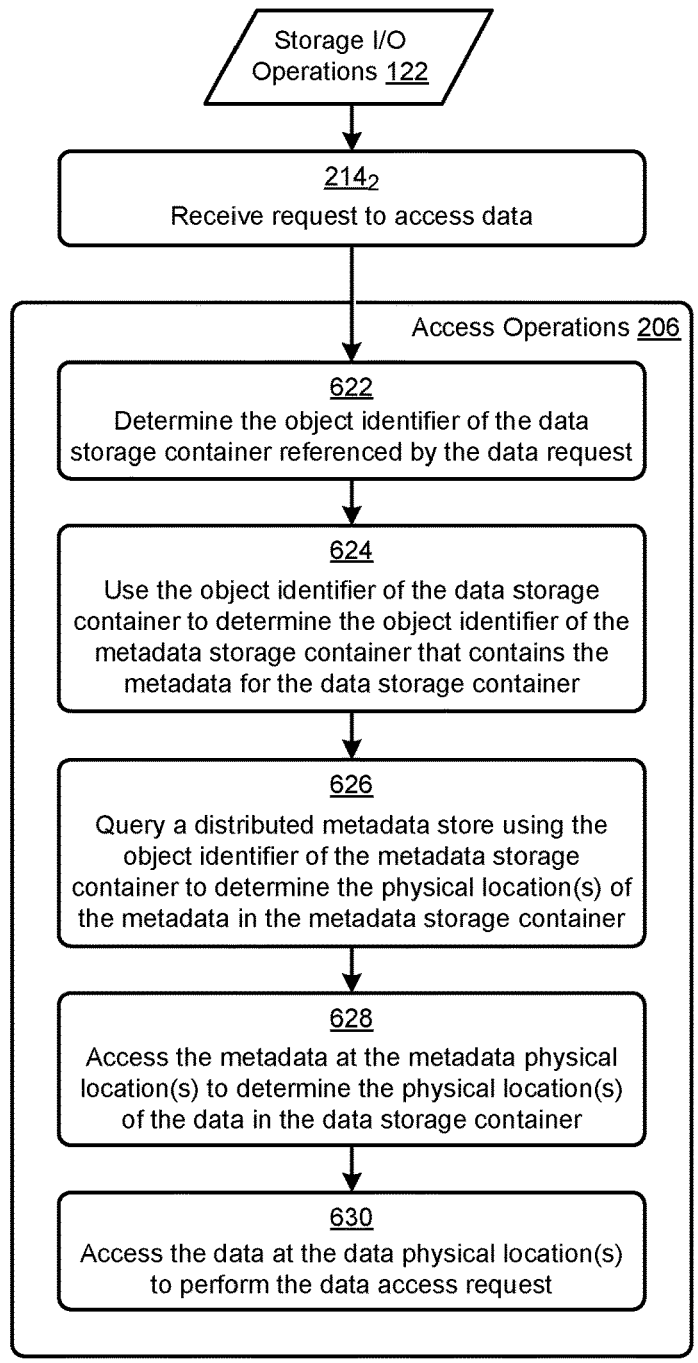
FIG. 6 depicts a data access technique as implemented in systems that facilitate management of multiple levels of metadata in distributed computing environments, according to an embodiment.

FIG. 6 depicts a data access technique 600 as implemented in systems that facilitate management of multiple levels of metadata in distributed computing environments. As an option, one or more variations of data access technique 600 or any aspect thereof may be implemented in the context of the architecture and functionality of the embodiments described herein. The data access technique 600 or any aspect thereof may be implemented in any environment.

The data access technique 600 presents one embodiment of certain steps and/or operations that facilitate access to data in distributed computing environments using multiple levels of metadata. As shown, a portion of the steps and/or operations of the data access technique 600 comprise an embodiment of the access operations 206 earlier described. As illustrated, the steps and/or operations of the embodiment of the access operations 206 presented in FIG. 6 are invoked by receiving a request to access data (step $214_2$) from storage I/O operations 122. An object identifier associated with the data storage container (e.g., data vDisk) referenced by the data request is determined (step 622). For example, a data vDisk named "disk2" might be identified by the object identifier "d2.vmdk". The object identifier of the data storage container (e.g., "d2.vmdk") is used to determine the object identifier of the metadata storage container (e.g., metadata vDisk) that contains metadata for the data storage container (step 624).

The object identifier of the metadata storage container is used to query a distributed metadata store to determine the physical storage location(s) of the metadata in the metadata storage container (step 626). The metadata at the determined physical storage location(s) are accessed to determine the physical location(s) of the data in the data storage container (step 628). The physical location(s) of the stored data are accessed to perform the data access request (step 630).

A scenario illustrating an implementation of the data access technique 600 is disclosed in FIG. 7A through FIG. 7D.

FIG. 7A, FIG. 7B, FIG. 7C, and FIG. 7D illustrate a data access scenario 700 as implemented in systems that facilitate management of multiple levels of metadata in distributed computing environments. As an option, one or more variations of data access scenario 700 or any aspect thereof may be implemented in the context of the architecture and functionality of the embodiments described herein. The data access scenario 700 or any aspect thereof may be implemented in any environment.

The data access scenario 700 in FIG. 7A, FIG. 7B, FIG. 7C, and FIG. 7D presents a time sequence of operations pertaining to accessing data in systems that facilitate management of multiple levels of metadata in distributed computing environments. Specifically, the data access scenario 700 depicts the data vDisk "disk2" and the metadata vDisk "disk4" from the logical storage containers 372 as well as distributed metadata 392 as being stored in physical storage devices 374.

Figure 7A:
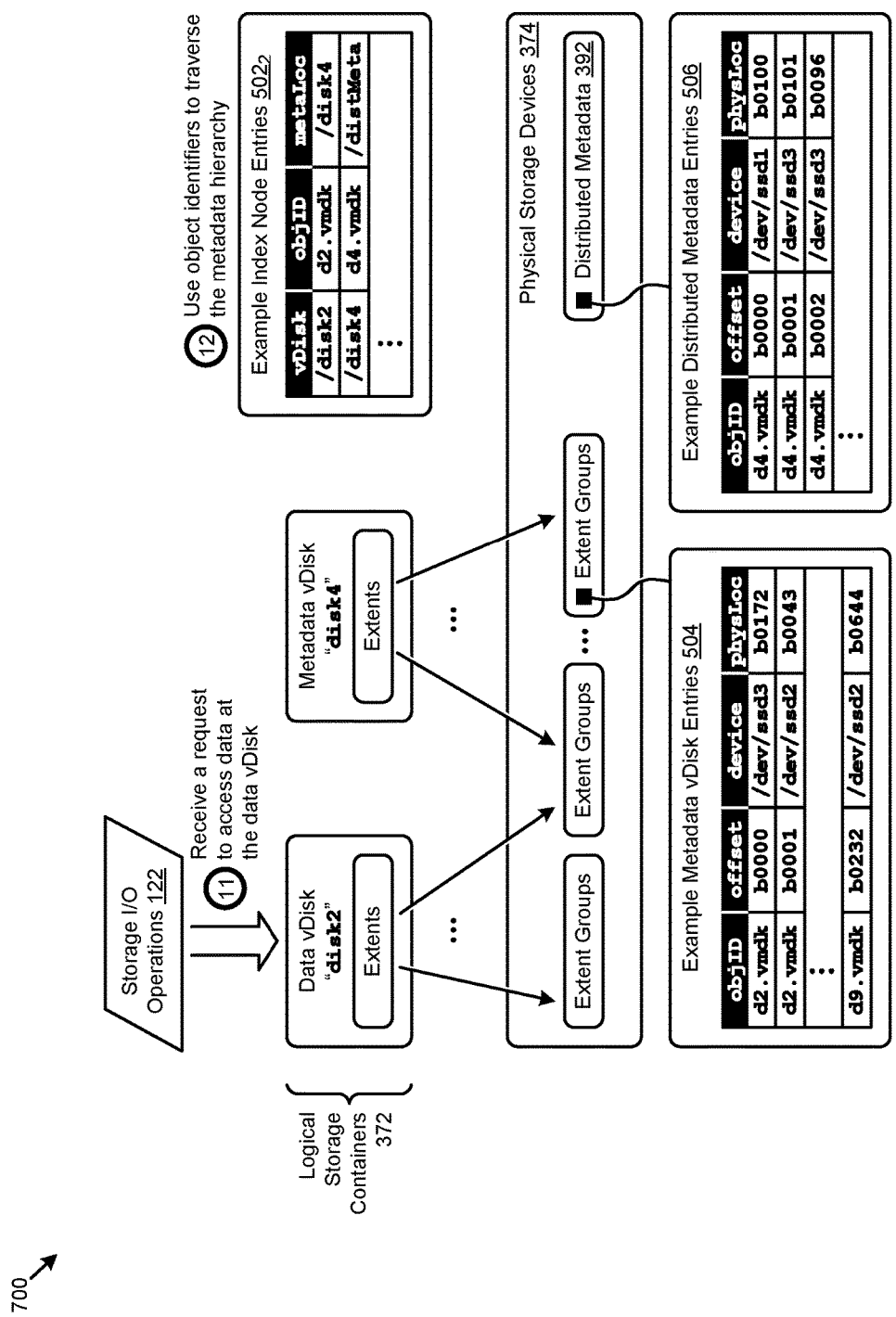
FIG. 7A, FIG. 7B, FIG. 7C, and FIG. 7D illustrate a data access scenario as implemented in systems that facilitate management of multiple levels of metadata in distributed computing environments, according to an embodiment.

Data access scenario 700 further presents the earlier described instances of example index node entries $502_2$, example metadata vDisk entries 504, and example distributed metadata entries 506. As shown in FIG. 7A, a request to access data at data vDisk "disk2" is received from storage I/O operations 122 (operation 11). To facilitate execution of the request, certain object identifiers are consulted to traverse the metadata hierarchy (operation 12). For example, in the example index node entries $502_2$, the object identifier "d2.vmdk" of the requested data vDisk "disk2" is mapped to object identifier "d4.vmdk" of the metadata vDisk "disk4", which in turn is mapped to the access point "/distmeta" of distributed metadata 392.

Figure 7B:
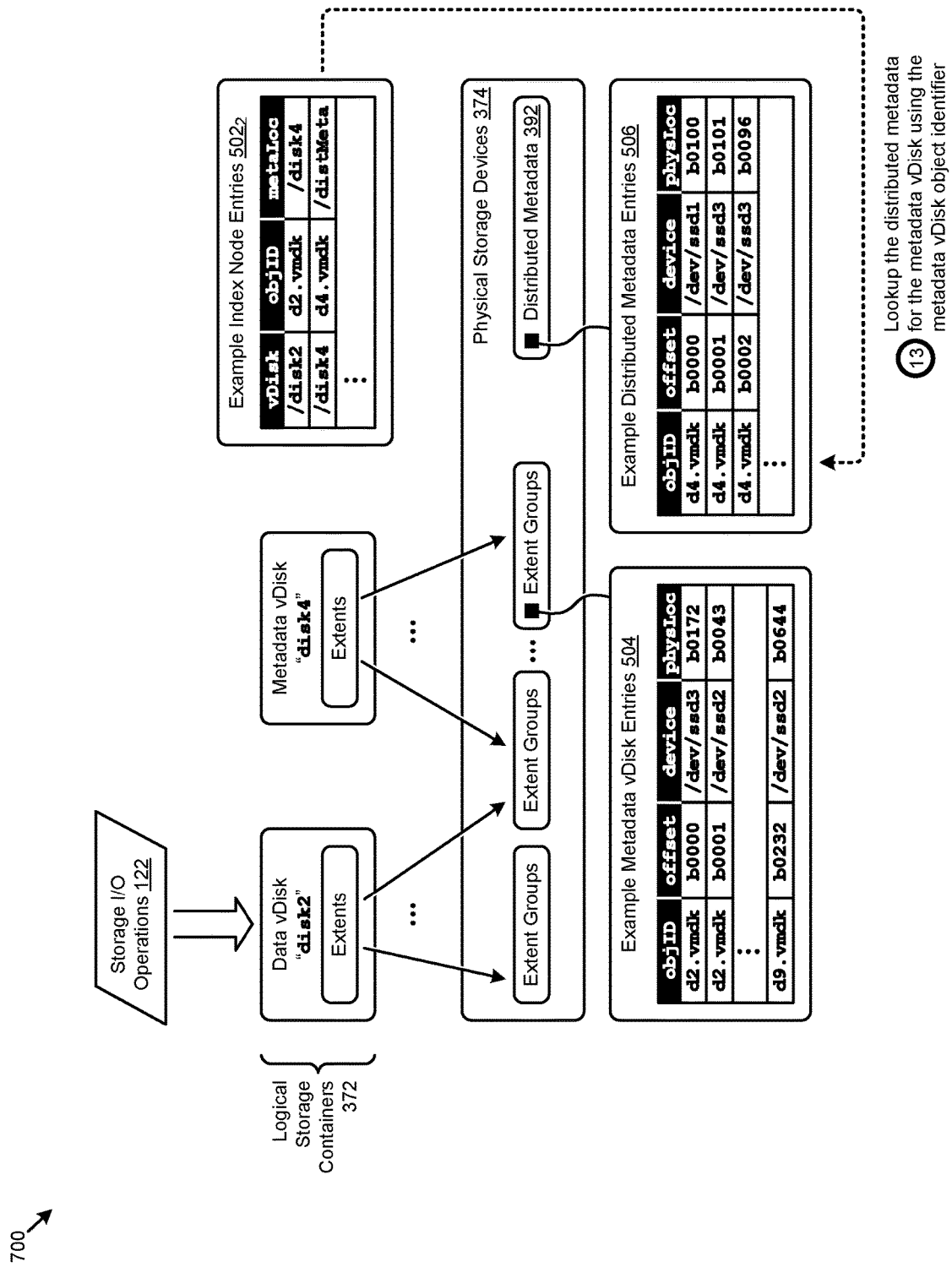
Figure 7C:
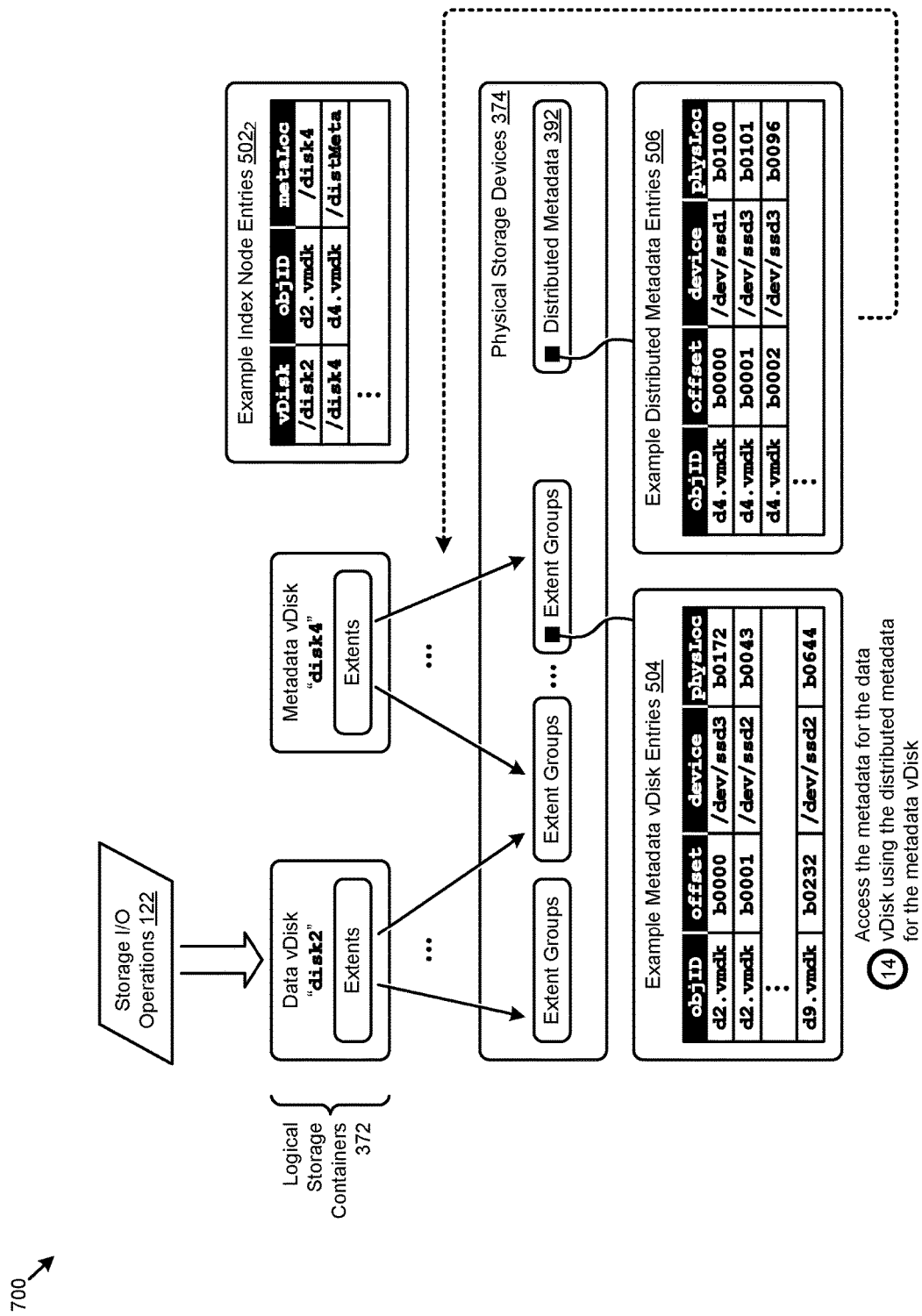
Figure 7D:
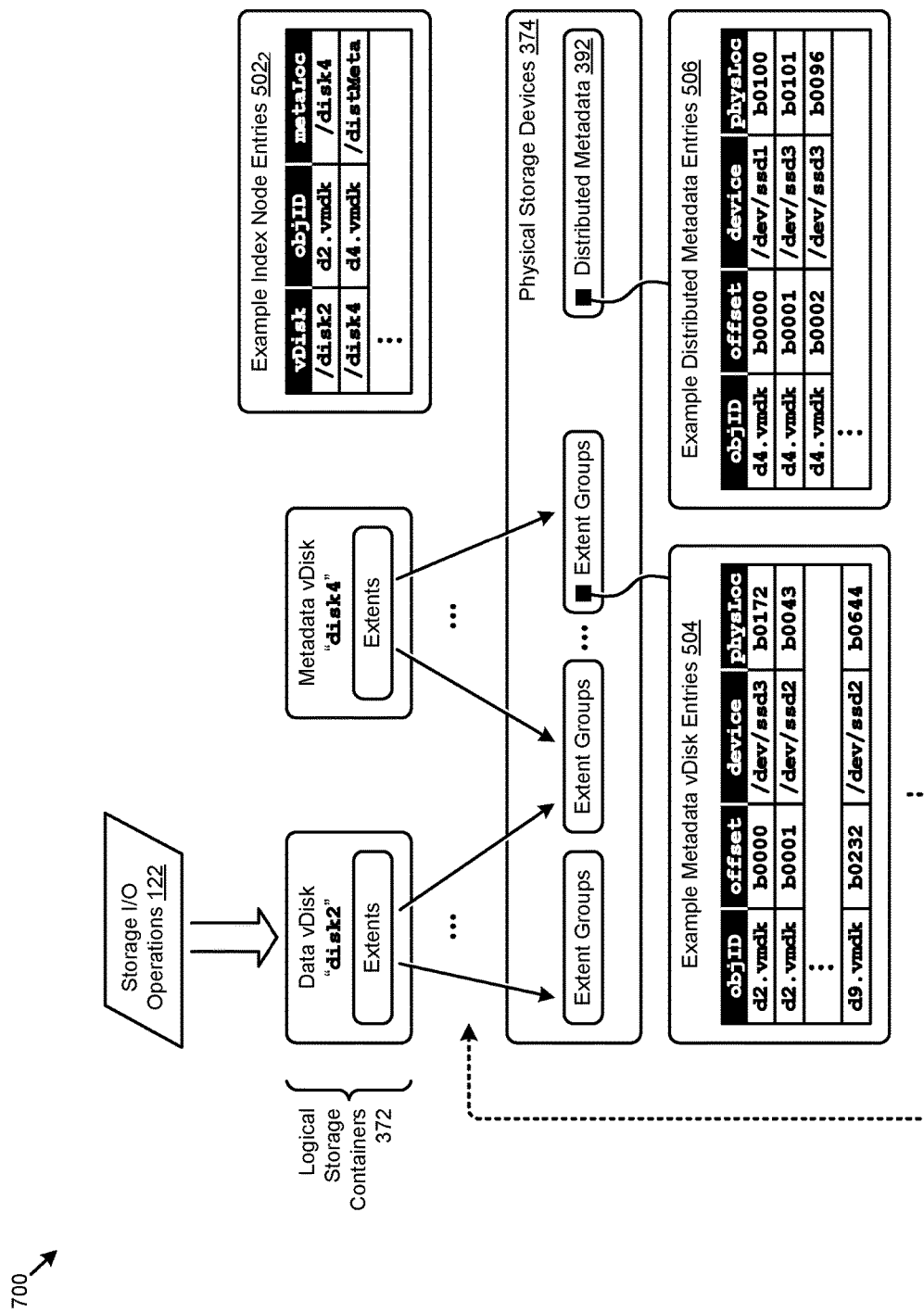

Referring to FIG. 7B, the distributed metadata associated with the metadata vDisk is accessed using the object identifier of the metadata vDisk (operation 13). For example, the object identifier "d4.vmdk" of metadata vDisk "disk4" might be used as the primary key in a query of distributed metadata 392 to determine the physical location of the stored metadata. Referring to FIG. 7C, the metadata for the data vDisk "disk2" is accessed using the distributed metadata for the metadata vDisk (operation 14). As an example, the example metadata vDisk entries 504 might be stored at physical block "b0101" of physical storage device "/dev/ssd3" in accordance with the example distributed metadata entries 506. As depicted in FIG. 7D, the data request can then be executed by accessing the data at data vDisk "disk2" using the metadata from metadata vDisk "disk4" (operation 15).

Additional Embodiments of the Disclosure

Additional Practical Application Examples

Figure 8:
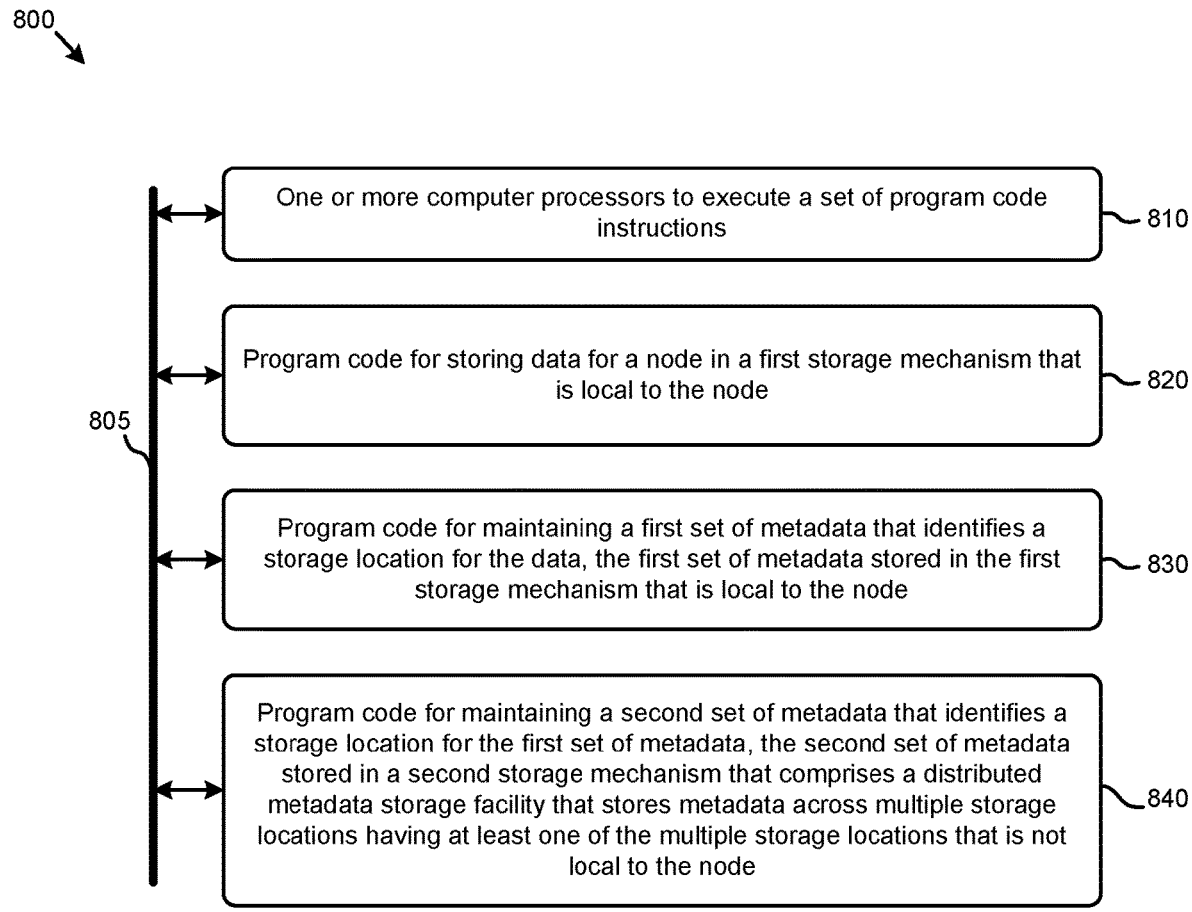
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently managing large volumes of fault tolerant metadata used to access large volumes of stored data in computing environments. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising a computer processor to execute a set of program code instructions (module 810) and modules for accessing memory to hold program code instructions to perform: storing data for a node in a first storage mechanism that is local to the node (module 820); maintaining a first set of metadata that identifies a storage location for the data, the first set of metadata stored in the first storage mechanism that is local to the node (module 830); and maintaining a second set of metadata that identifies a storage location for the first set of metadata, the second set of metadata stored in a second storage mechanism that comprises a distributed metadata storage facility that stores metadata across multiple storage locations having at least one of the multiple storage locations that is not local to the node (module 840).

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

System Architecture Overview

Additional System Architecture Examples

Figure 9A:
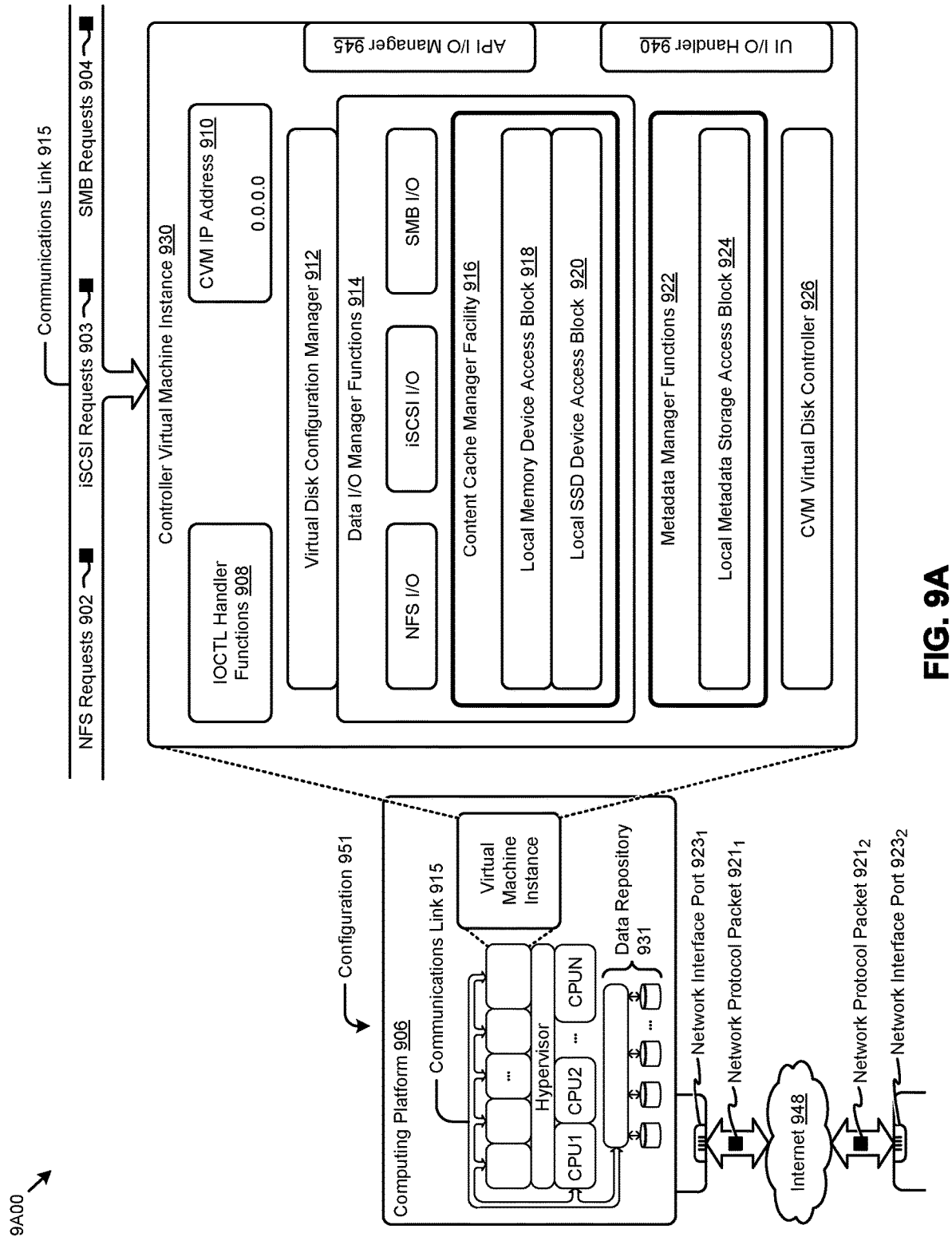
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 930 includes content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). External data repository 931 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 924. External data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of multiple levels of metadata in distributed computing environments. In some embodiments, a module may include one or more state machines and/or combinational logic used to implement or facilitate the operational and/or performance characteristics pertaining to management of multiple levels of metadata in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing multiple levels of metadata in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing multiple levels of metadata in distributed computing environments, and/or for improving the way data is manipulated when performing computerized operations pertaining to managing the metadata associated with stored data in accordance with the mechanism implemented for managing the stored data so as to reduce resource consumption and improve performance.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
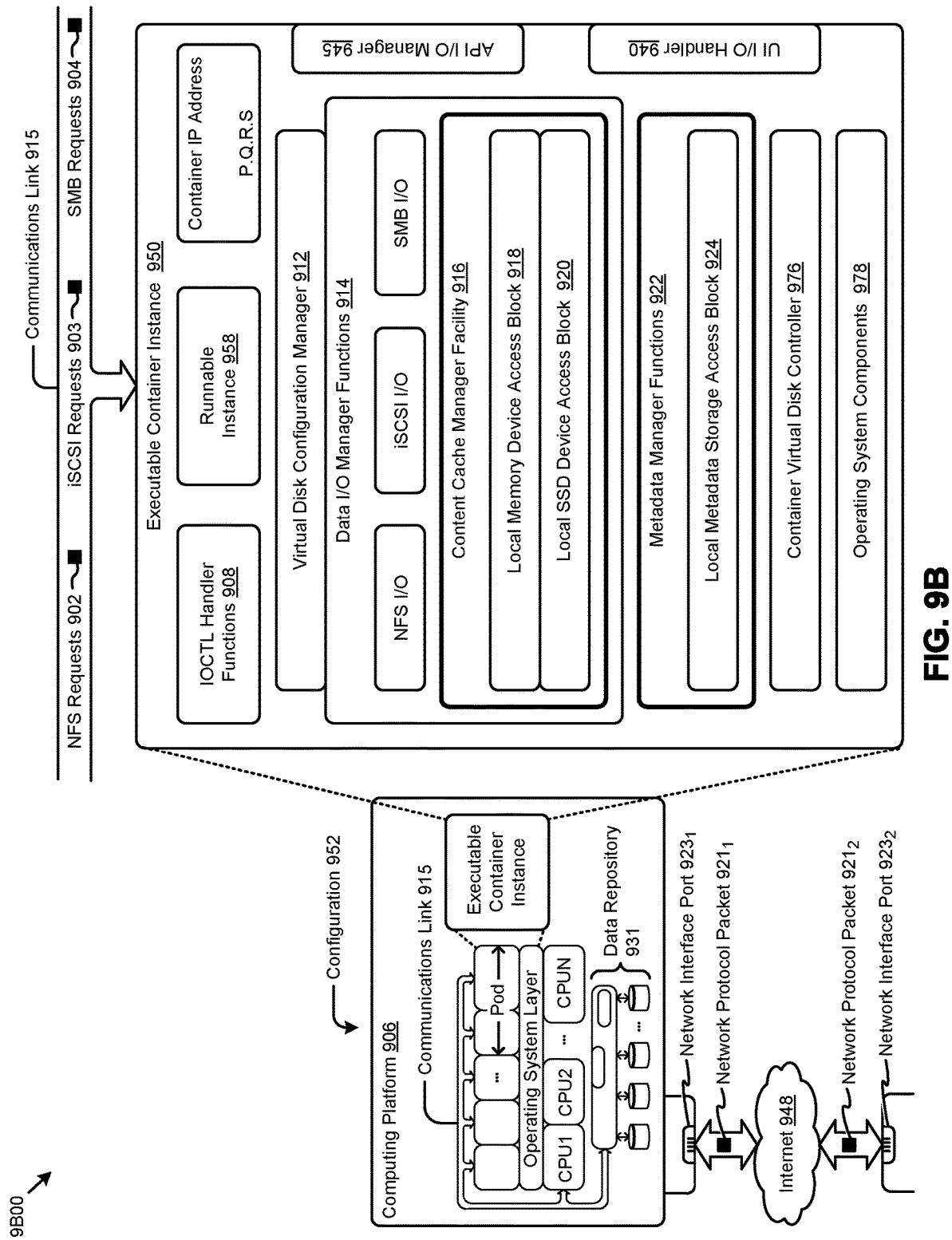

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to the executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
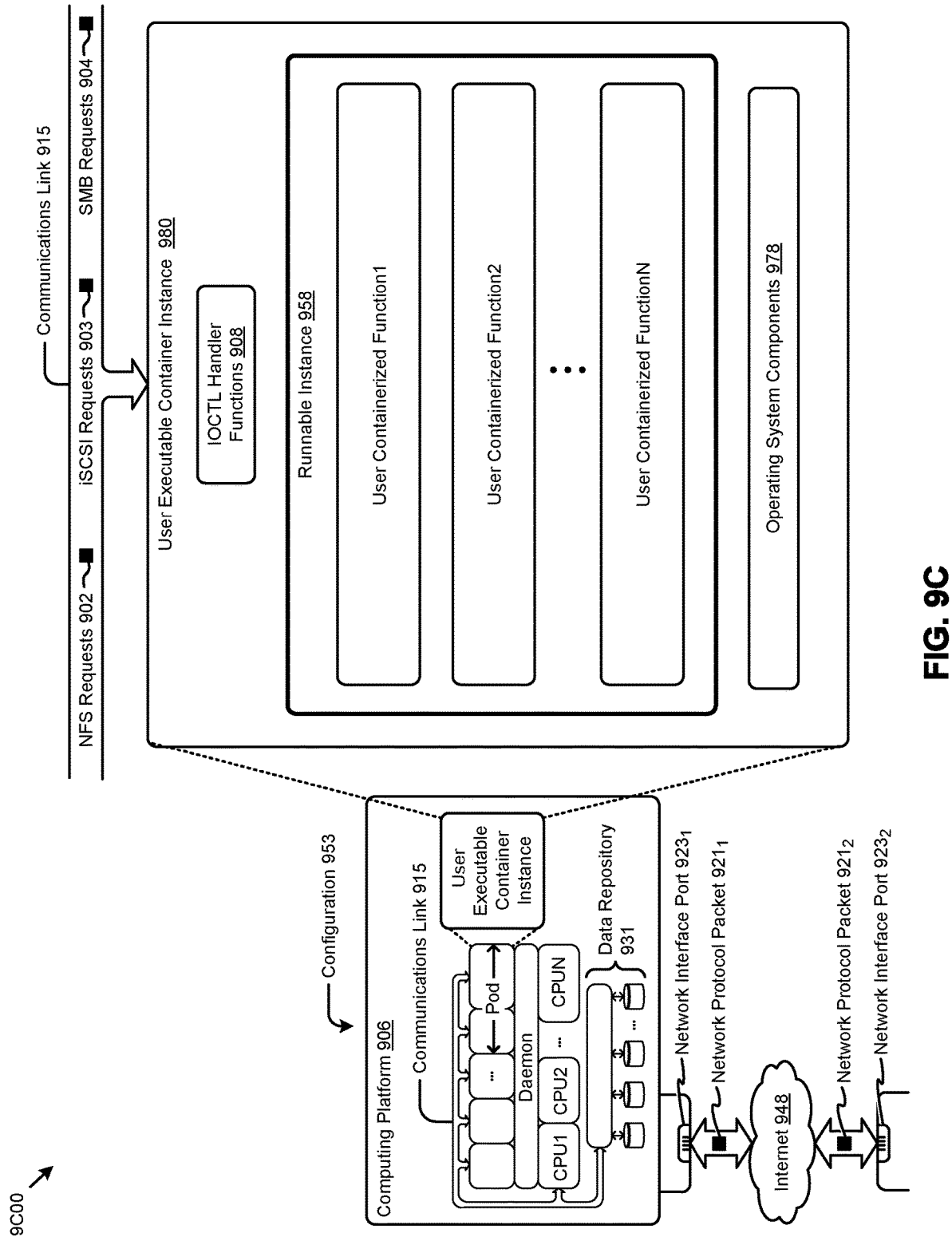

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown instance of daemon-assisted containerized architecture 9C00 includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage, where the tiers of storage might be formed using the shown data repository 931 and/or any forms of network accessible storage. As such, the multiple tiers of storage may include storage that is accessible over the communications link 915. Such network accessible storage may include cloud storage or networked storage (e.g., a SAN or "storage area network").

Unlike prior approaches, the herein-discussed embodiments of a storage pool include local storage that is within or directly attached to the server or node to be managed as part of a storage pool. Such local storage can include any combinations of the aforementioned SSDs and/or HDDs and/or RAPMs and/or hybrid disk drives. In some cases, the local storage that is within or directly attached to the server or node is directly attached in that the node does not communicate over the communications link 915 when accessing local storage. In many cases, the local storage is local to the node because the storage devices that comprise the local storage are on the same motherboard that forms the node, or in the same chassis as the node, or in the same rack as the node, or in the same data center as the node.

The node can still access certain network-attached storage over the communications link 915, which network-attached storage might be located in a different geography or located on the far side of a public switched network such as the Internet. The distributed metadata store as discussed herein often shards a key-value pair across many nodes organized into a ring. Each node hosts a one or more of the shards (e.g., an assigned shard as well as a shard from that node's previous ring-wise neighbor node and a shard from that node's next ring-wise neighbor node). Any of the nodes of the ring might be geographically collocated, or might be geographically distant from another node of the ring, or might be distributed across any combination of local neighbor nodes and/or distal neighbor nodes.

The address spaces of a plurality of storage devices, including both local storage (e.g., using at least one node-internal, locally-attached storage device) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual, since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments a vDisk is mountable. In some embodiments a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine "SVM", or as a service executable container, or as a "storage controller".

In some embodiments, multiple storage controllers are hosted by multiple nodes. Such storage controllers coordinate within a computing system to form a computing cluster. The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   maintaining multiple types of metadata for content within a storage pool, wherein the storage pool is formed from local storage devices distributed across multiple nodes connected over a network,
   a first type of metadata being stored at respective nodes of the multiple nodes and at least identifying a physical storage location for data stored in a storage device at the same respective node, and
   a second type of metadata being distributed across the multiple nodes connected over the network and identifying physical storage locations of the first type of metadata at each node of the multiple nodes; and wherein an access request for data is serviced at least by accessing the second type of metadata distributed across the multiple nodes to determine a physical storage location for a corresponding portion of the first type of metadata at the same node as the data.

2. The method of claim 1, wherein the first type of metadata comprises cascaded metadata.

3. The method of claim 1, wherein the first type of metadata comprises cascaded metadata and the cascaded metadata comprises multiple levels of subsets of metadata at the respective nodes, wherein a first subset identifies the physical storage location of the data, a second subset identifies a physical storage location of the first subset.

4. The method of claim 3, further comprising:
accessing an initial level of the multiple levels of the cascaded metadata to identify a physical address of a portion of the data that is local to the node and iteratively accessing successively next levels of the cascaded metadata until the physical address of the portion of the data that is local to the node is identified or until a last level of the multiple levels of the cascaded metadata is reached.

5. The method of claim 1, wherein the multiple nodes connected over the network comprises a multi-node ring structure or the second type of metadata comprises a key-value store.

6. The method of claim 3, wherein a portion of the data that is local to the node is accessed when a physical address of the data that is local to the node is identified by accessing one of multiple levels of the cascaded metadata.

7. The method of claim 1, wherein at least one of, the first type of metadata, or the second type of metadata, codify a logical-to-physical mapping associated with a virtual disk.

8. The method of claim 1, wherein the second type of metadata comprises metadata associated with an unpopulated portion of data that is local to the node.

9. A non-transitory computer readable medium having stored thereon a sequence of instructions which, when stored in memory and executed by a processor causes the processor to perform a set of acts the acts comprising:
maintaining multiple types of metadata for content within a storage pool, wherein the storage pool is formed from local storage devices distributed across multiple nodes connected over a network,
a first type of metadata being stored at respective nodes of the multiple nodes and at least identifying a physical storage location for data stored in a storage device at the same respective node, and
a second type of metadata being distributed across the multiple nodes connected over the network and identifying physical storage locations of the first type of metadata at each node of the multiple nodes; and
wherein an access request for data is serviced at least by accessing the second type of metadata distributed across the multiple nodes to determine a physical storage location for a corresponding portion of the first type of metadata at the same node as the data.

10. The computer readable medium of claim 9, wherein the first type of metadata comprises cascaded metadata.

11. The computer readable medium of claim 9, wherein the first type of metadata comprises cascaded metadata and the cascaded metadata comprises multiple levels of subsets of metadata at the respective nodes, wherein a first subset identifies the physical storage location of the data, a second subset identifies a physical storage location of the first subset.

12. The computer readable medium of claim 11, the set of acts further comprising:
accessing an initial level of the multiple levels of the cascaded metadata to identify a physical address of a portion of the data that is local to the node and iteratively accessing successively next levels of the cascaded metadata until the physical address of the portion of the data that is local to the node is identified or until a last level of the multiple levels of the cascaded metadata is reached.

13. The computer readable medium of claim 9, wherein the multiple nodes connected over the network comprises a multi-node ring structure or the second type of metadata comprises a key-value store.

14. The computer readable medium of claim 9, wherein the second type of metadata comprises metadata associated with an unpopulated portion of data that is local to the node.

15. The computer readable medium of claim 11, wherein a portion of the data that is local to the node is accessed when a physical address of the data that is local to the node is identified by accessing one of multiple levels of the cascaded metadata.

16. The computer readable medium of claim 9, wherein at least one of, the first type of metadata, or the second type of metadata, codify a logical-to-physical mapping associated with a virtual disk.

17. A system comprising:
a storage medium having stored thereon a sequence of instructions; and
a processor that execute the sequence of instructions to cause the processor to perform a set of acts comprising,
maintaining multiple types of metadata for content within a storage pool, wherein the storage pool is formed from local storage devices distributed across multiple nodes connected over a network,
a first type of metadata being stored at respective nodes of the multiple nodes and at least identifying a physical storage location for data stored in a storage device at the same respective node, and
a second type of metadata being distributed across the multiple nodes connected over the network and identifying physical storage locations of the first type of metadata at each node of the multiple nodes; and
wherein an access request for data is serviced at least by accessing the second type of metadata distributed across the multiple nodes to determine a physical storage location for a corresponding portion of the first type of metadata at the same node as the data.

18. The system of claim 17, wherein the first type of metadata comprises cascaded metadata.

19. The system of claim 17, wherein the first type of metadata comprises cascaded metadata and the cascaded metadata comprises multiple levels of subsets of metadata at the respective nodes, wherein a first subset identifies the physical storage location of the data, a second subset identifies a physical storage location of the first subset.

20. The system of claim 19, the set of acts further comprising:
accessing an initial level of the multiple levels of the cascaded metadata to identify a physical address of a portion of the data that is local to the node and iteratively accessing successively next levels of the cascaded metadata until the physical address of the portion of the data that is local to the node is identified or until a last level of the multiple levels of the cascaded metadata is reached.

21. The system of claim 19, wherein a portion of the data that is local to the node is accessed when a physical address of the data that is local to the node is identified by accessing one of multiple levels of the cascaded metadata.

22. The system of claim 17, wherein the multiple nodes connected over the network comprises a multi-node ring structure or the second type of metadata comprises a key-value store.

23. The system of claim 17, wherein the second type of metadata comprises metadata associated with an unpopulated portion of data that is local to the node.

24. The system of claim 17, wherein at least one of, the first type of metadata, or the second type of metadata, codify a logical-to-physical mapping associated with a virtual disk.

* * * * *